United States Patent [19]

Hallbach et al.

[11] Patent Number: 4,546,533
[45] Date of Patent: Oct. 15, 1985

[54] AUTOMATIC TOOLCHANGER SYSTEM FOR TURNING MACHINE

[75] Inventors: Raymond L. Hallbach, Covington, Ky.; John S. Reynolds, Maineville, Ohio

[73] Assignee: Cincinnati Milacron Inc., Cincinnati, Ohio

[21] Appl. No.: 415,518

[22] Filed: Sep. 7, 1982

[51] Int. Cl.$^4$ .......................................... B23Q 3/155
[52] U.S. Cl. ..................................... 29/568; 29/27 C
[58] Field of Search .............. 29/568, 33 P, 563, 27 C

[56] References Cited

U.S. PATENT DOCUMENTS

| | | | |
|---|---|---|---|
| 3,477,121 | 11/1969 | Martin | 29/568 |
| 3,703,510 | 12/1972 | Sedgwick et al. | 29/568 |
| 3,744,124 | 7/1973 | Gardner | 29/568 |
| 3,760,490 | 9/1973 | Burg | 29/568 |
| 3,760,491 | 9/1973 | Zankl et al. | 29/568 |
| 3,811,179 | 5/1974 | Anderson | 29/568 |
| 3,822,466 | 7/1974 | Noguchi et al. | 29/568 |
| 4,237,598 | 12/1980 | Williamson | 29/568 |
| 4,240,194 | 12/1980 | Inami et al. | 29/568 |

OTHER PUBLICATIONS

Automatic Guided Vehicle System Bulletin, Mentor Products Inc., Mentor, Ohio.

*Primary Examiner*—Z. R. Bilinsky
*Attorney, Agent, or Firm*—Thomas M. Farrell

[57] ABSTRACT

A tool changing system for turning machines is disclosed wherein a tool magazine having a plurality of common-based tools carries the tools on a serpentine chain matrix. The tool holders are secured to the links of the chain. The tool storage magazine is removable from the tool changer base, and replaceable with a similar tool storage magazine. A tool interchange arm is carried on a dual slide assembly, wherein a first slide moves a pair of gripper fingers to positions between the tool holder block on the tool turret of the machine and the tool storage magazine. When changing ID tools, which are mounted to the face of a tool turret, a secondary slide is moved relative to the first slide, to provide additional onward stroke positioning, and a turn-around cylinder rotates the interchange arm housing and gripper fingers to bring the tools around to the face of the tool turret. The tool storage magazines may be received in a pallet system, which is a movable rack at the end of the machine, having a pair of tool holder brackets, which may be alternately positioned for receiving and inserting the tool storage magazine.

2 Claims, 54 Drawing Figures

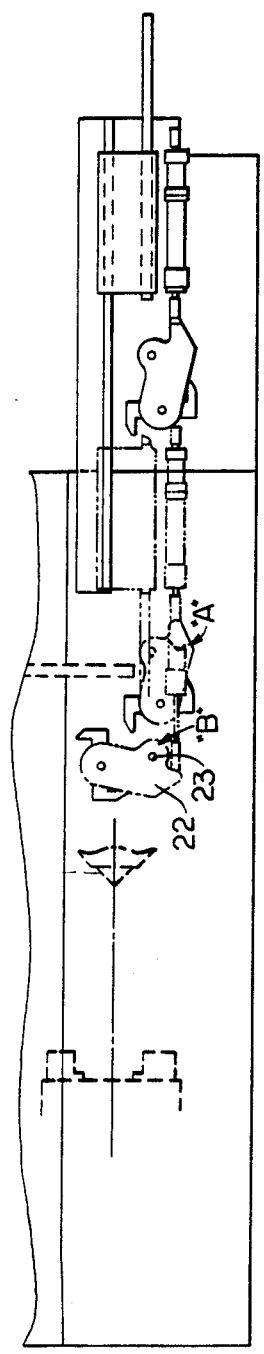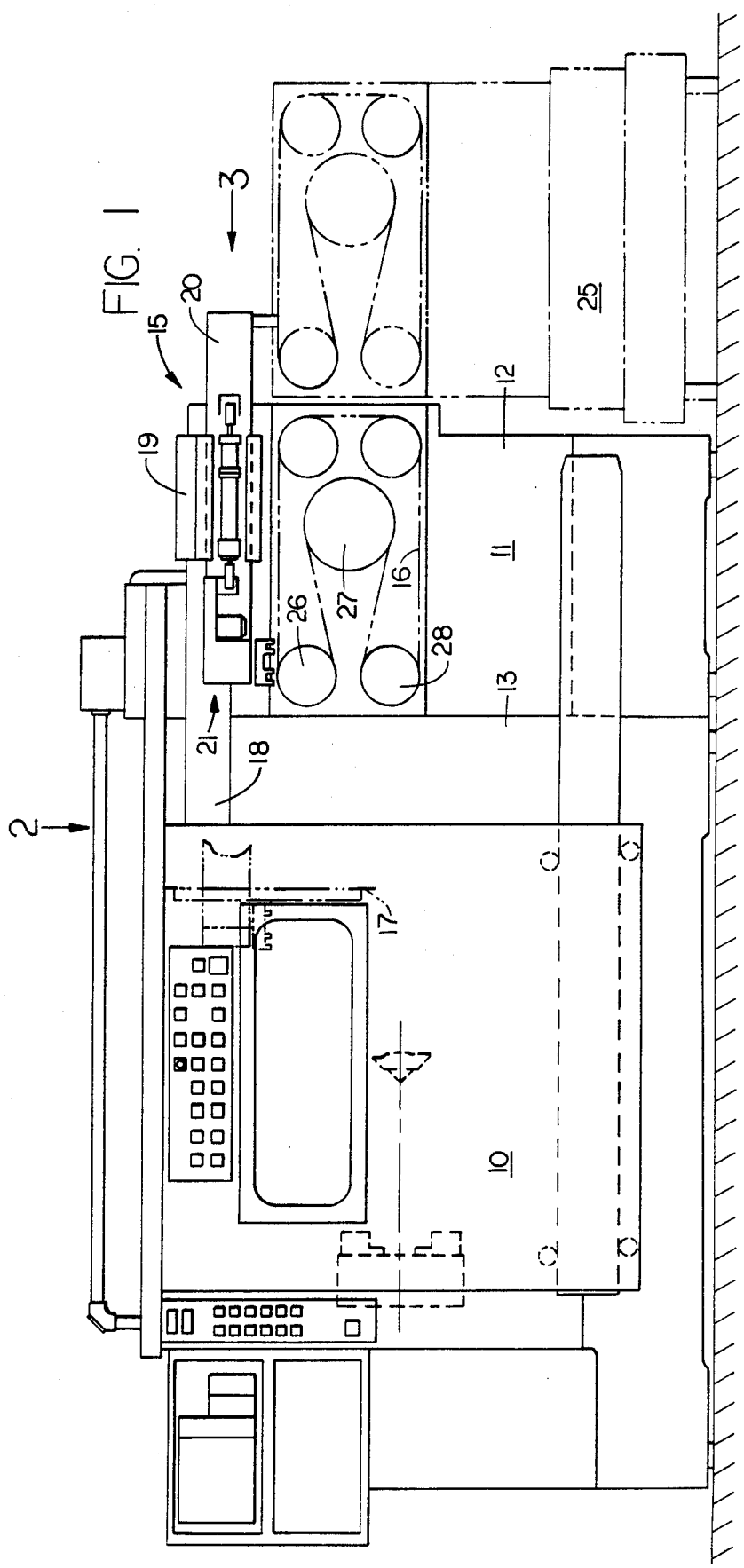

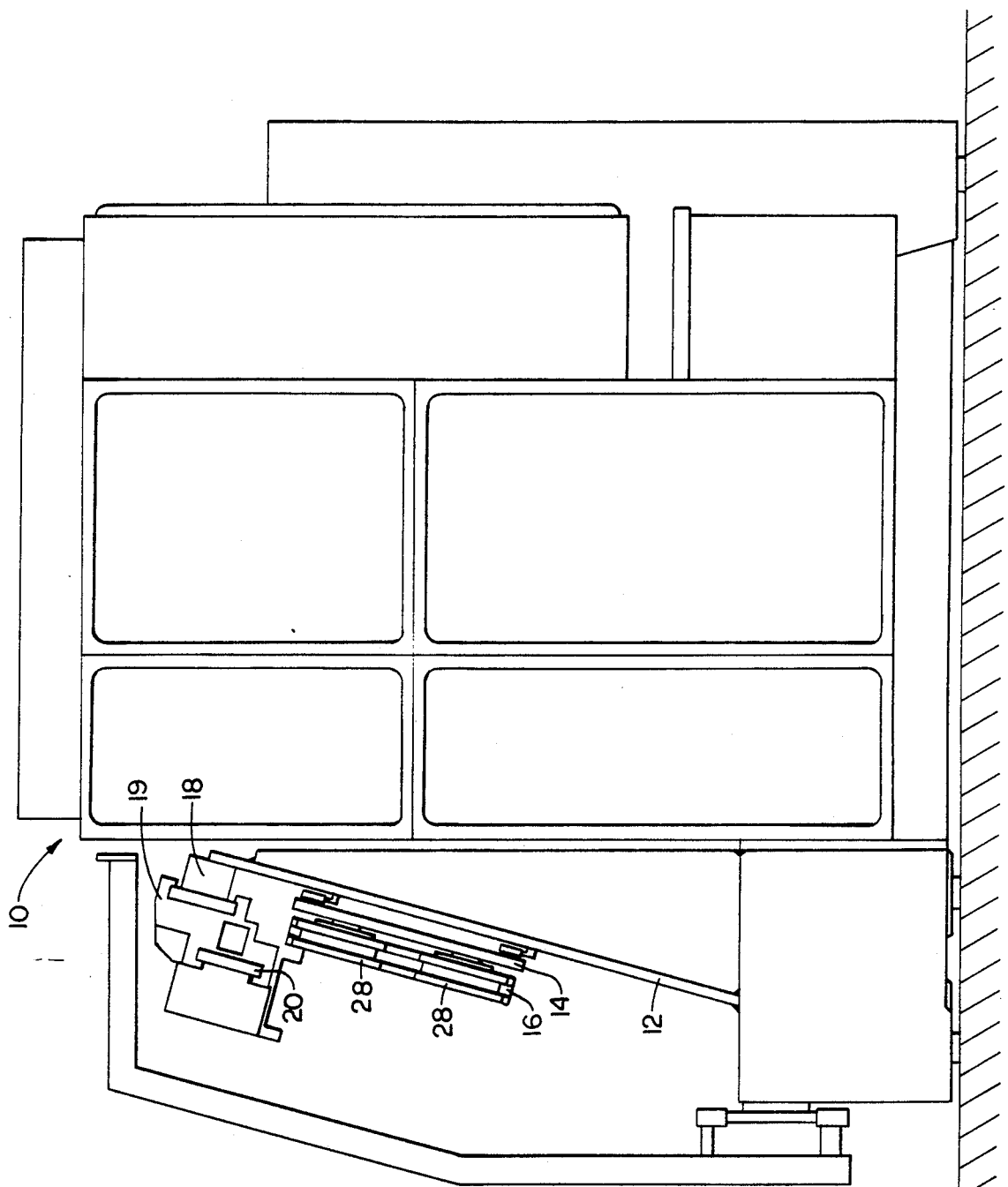

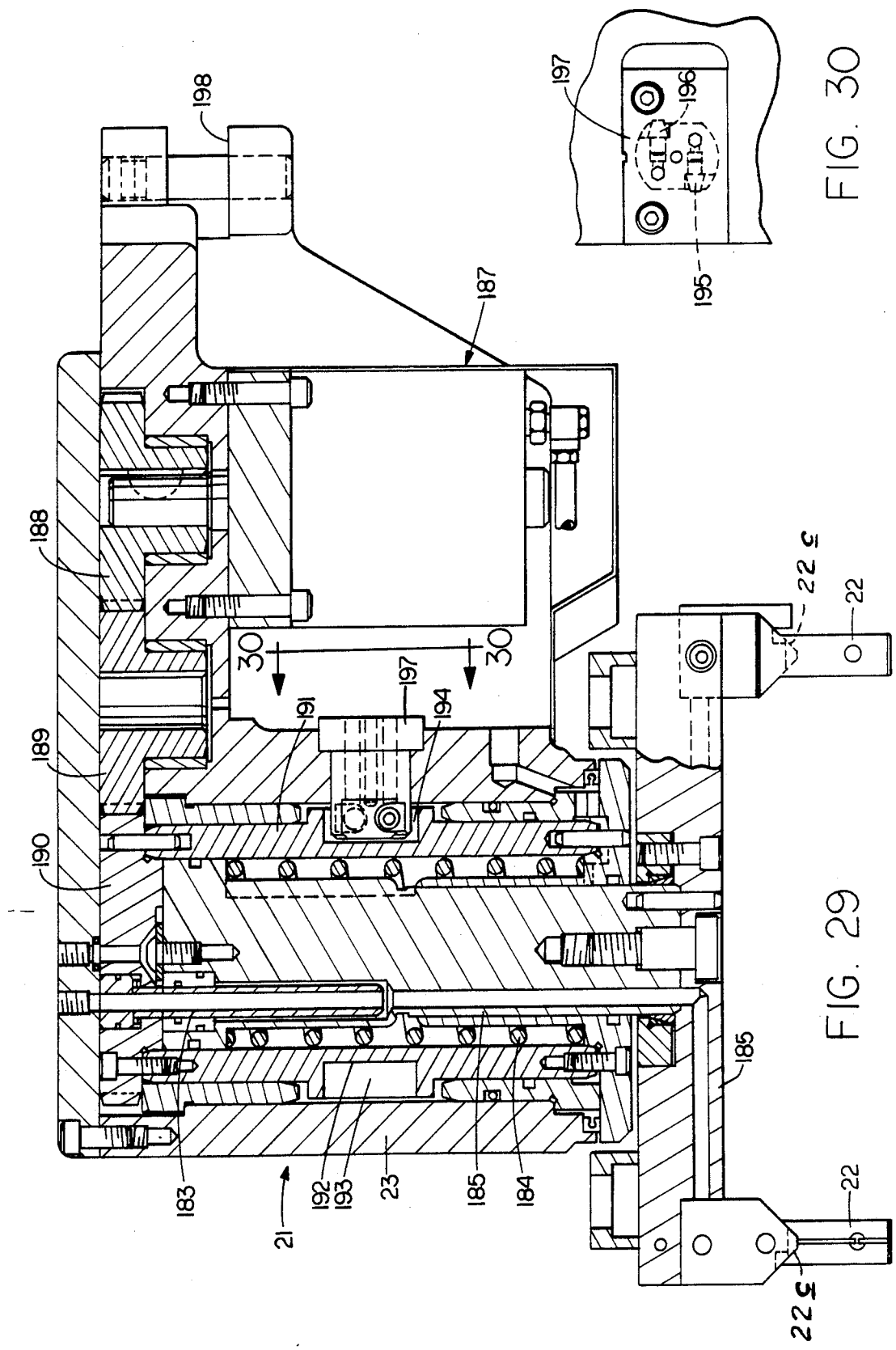

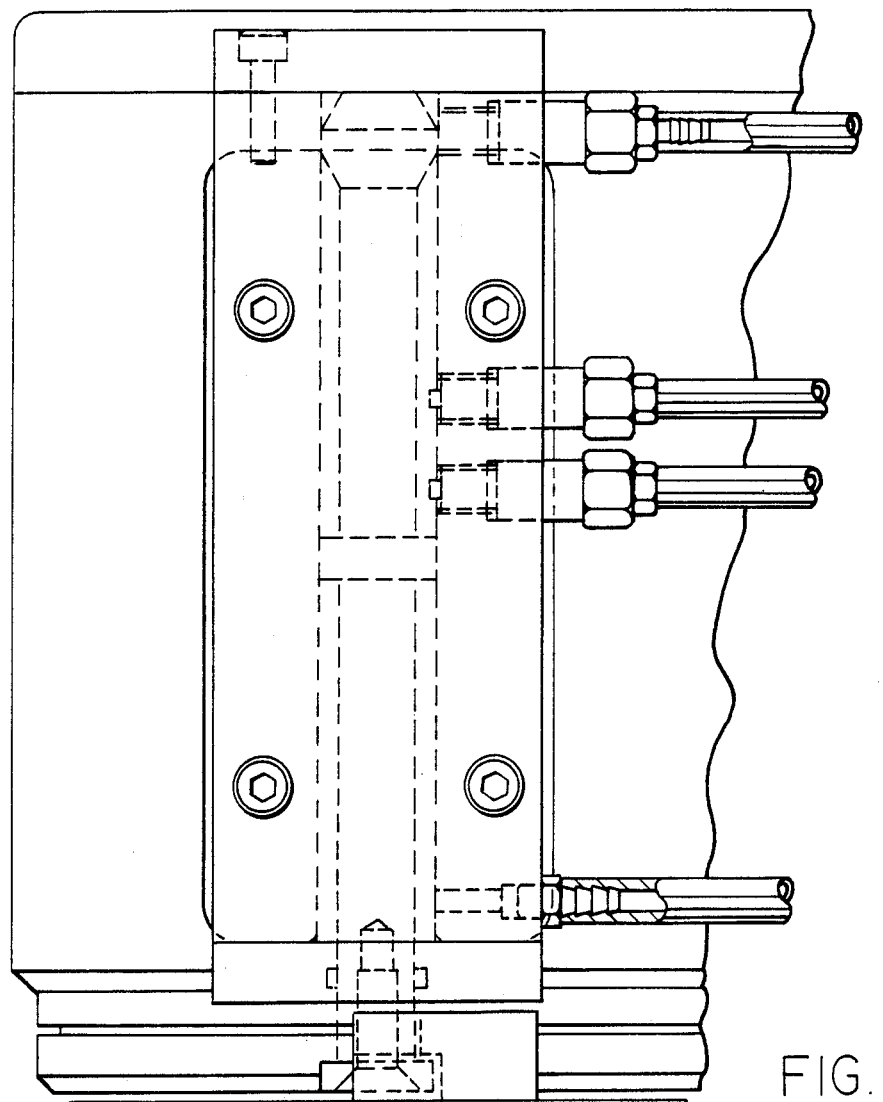
FIG. 31
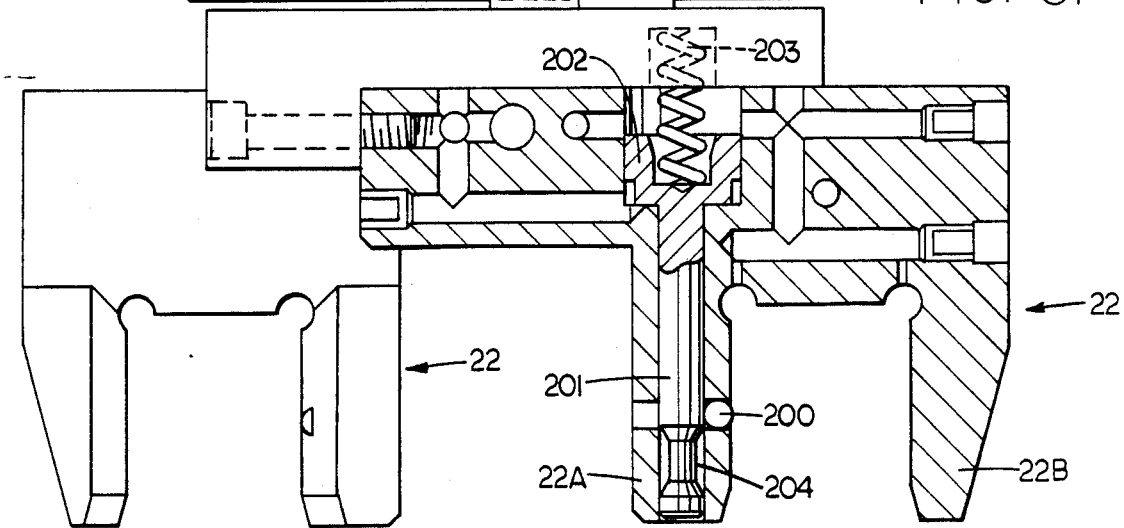

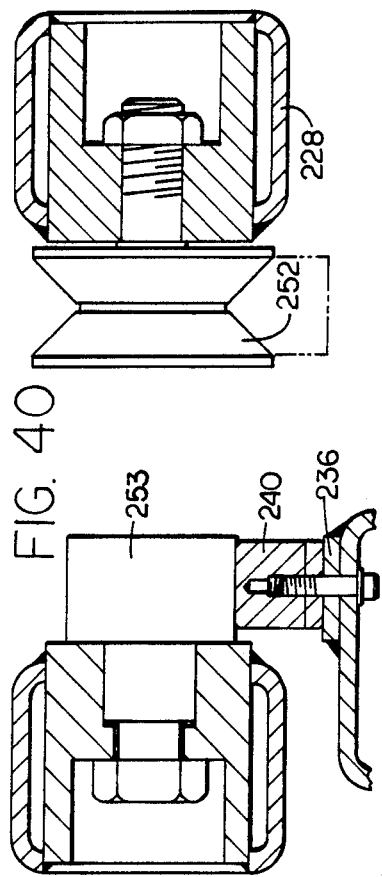
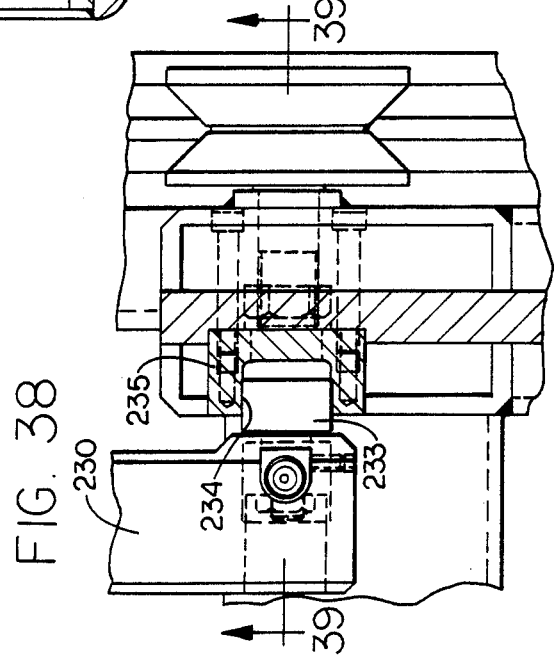
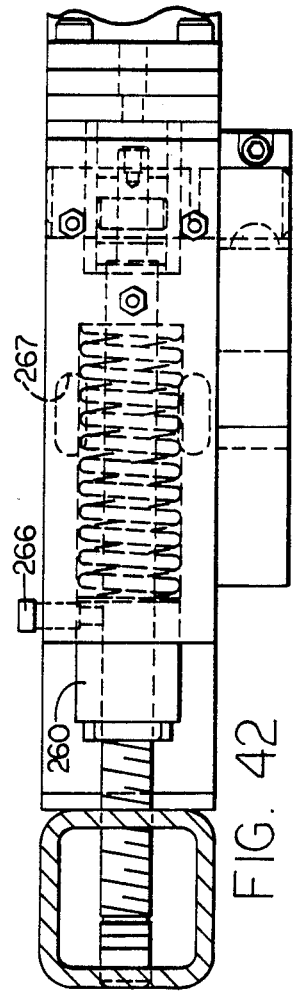
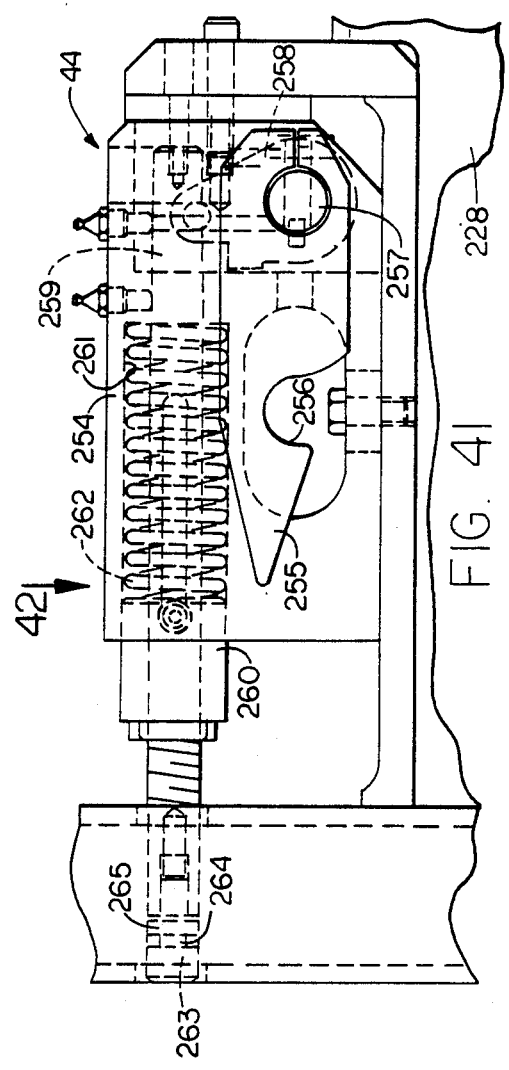
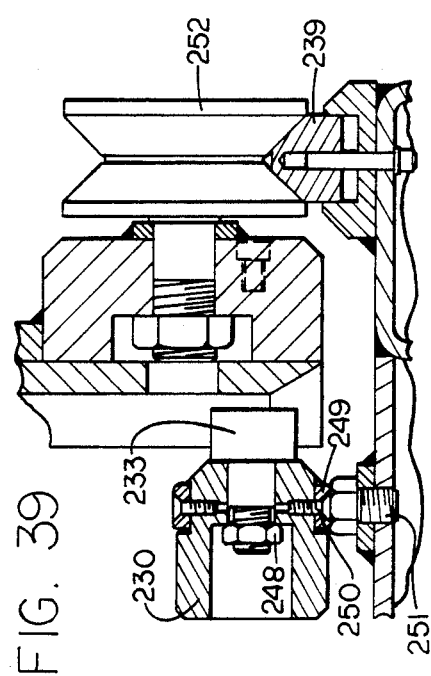

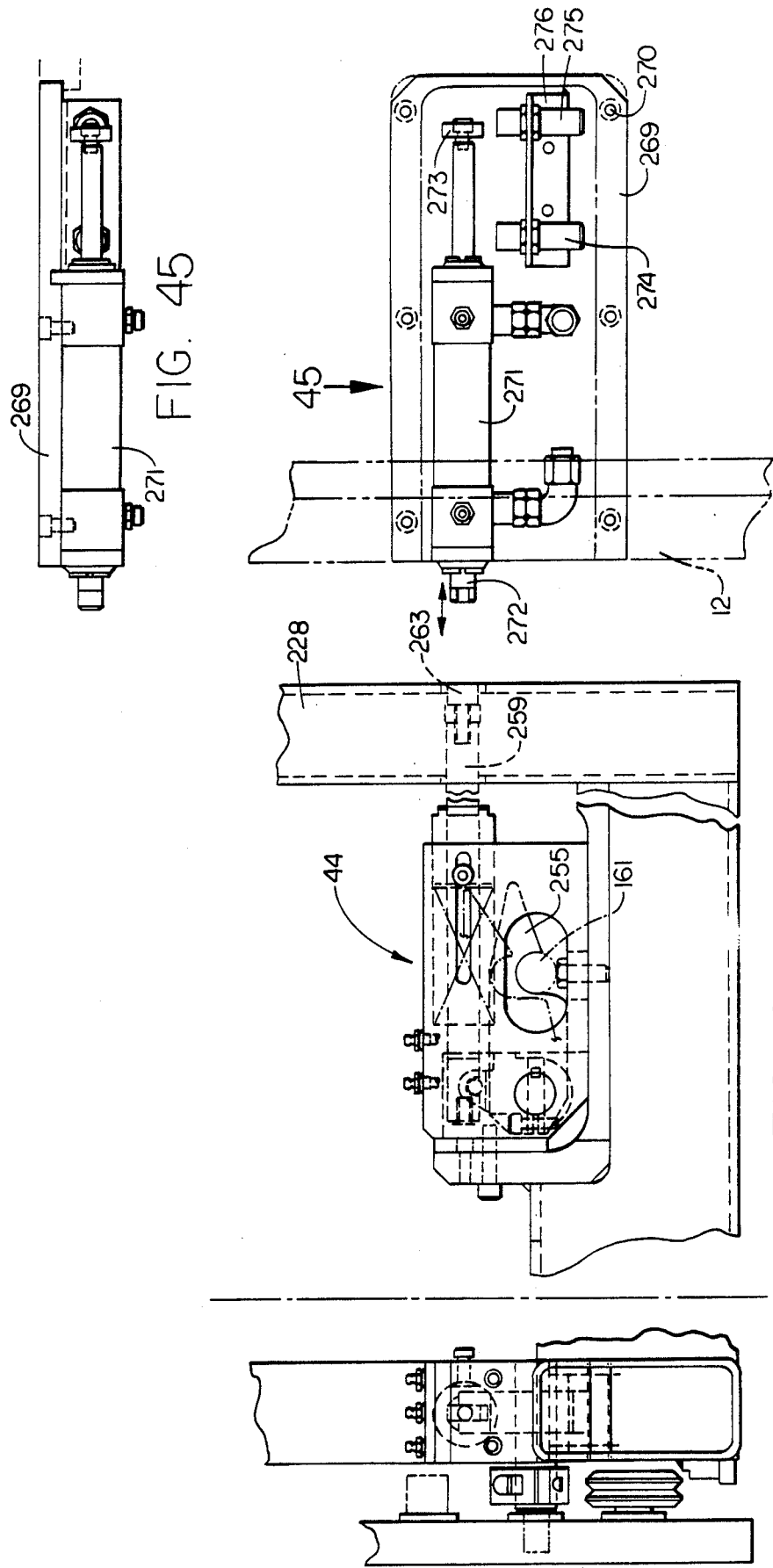

1

AUTOMATIC TOOLCHANGER SYSTEM FOR TURNING MACHINE

BACKGROUND OF THE INVENTION

The invention relates generally to machine tools, and in particular to turning machines employing a plurality of common based tools which are to be interchanged between a tool storage matrix and a tool holder on the turning machine.

In prior art machine tool assemblies, it has been known to apply a high density tool storage matrix which embodies a chain-type tool carrier to conserve space over those systems which seat the tools in a drum or wheel. One such system is that the U.S. Pat. No. 3,987,909 which depicts a pair of switchable chain matrices for presenting tools to a common pick-up point. The chains are not removable from the machine, which is a milling machine.

A unique cutting tool for turning machines has been developed by the Sandvik Corp. of Sweden and is disclosed in U.S. Pat. No. 4,270,422. The system utilizes a plurality of tools having a common locating and locking section for interchangeability with a tool holder.

European Pat. No. 0044914 has been issued to Sandvik Coromant illustrating the stacking and storage of the Sandvik tools in vertical linear magazines, each magazine containing the same tool for replacement of dull and broken tools on a turning machine.

It has not been proposed in the prior art to hold a plurality of common based tools for a turning machine in a random access tool storage matrix, which is serviced by an automatic changing arm, for exchanging tools with the tool matrix and a tool holder on a turning machine. Applicants have obviated the difficulties inherent in prior art mechanism by a novel tool storage and changing system.

SUMMARY OF THE INVENTION

The invention is shown embodied in a tool changer for turning machines, utilizing a chain type serpentine tool storage matrix, wherein common based tools are located in tool holders carried on the chain links. The chain matrix is removable from the tool changer base and replacable with a like tool storage matrix. A double slide tool changer is employed, having a first slide movable for positioning gripping fingers to a position where tools can be exchanged between the tool storage matrix and a side of OD tool position of a tool turret. A secondary slide is carried by the first slide, and is powered to a furthermost point beyond the OD tool position, wherein ID tools can be exchanged with an ID position on the tool turret by also utilizing a pivotal housing carrying the gripper fingers.

DESCRIPTION OF THE DRAWINGS

FIG. 1 is a front elevation view of a turning machine having an automatic tool changer system.

FIG. 2 is a plan view taken in the direction of arrow 2 of FIG. 1.

FIG. 3 is a right side elevational view taken in the direction of arrow 3 of FIG. 1.

FIG. 29 is a front elevational section through the interchange arm housing.

FIG. 30 is a side view of the stop block of the interchange arm housing taken in the direction of arrow 30 of FIG. 29.

FIG. 31 is a front view in partial section of the interchange arm assembly and gripper fingers.

FIG. 38 is a section through the crank mechanism taken along the line 38—38 of FIG. 37.

FIG. 39 is a section through the crank mechanism taken along the line 39—39 of FIG. 38.

FIG. 40 is a section through the pallet support rollers taken along the lines 40—40 of FIG. 37.

FIG. 41 is a front elevational view of the latching mechanism taken in the direction of arrow 41 of FIG. 37.

FIG. 42 is a plan view of the latching mechanism taken in the direction of arrow 42 of FIG. 41.

FIG. 44 is a rear elevational view of the latching mechanism and actuator piston taken in the direction of arrow 44 of FIG. 37.

FIG. 45 is a plan view of the latch actuating piston and cylinder, taken in the direction of arrow 45 of FIG. 44.

DESCRIPTION OF THE PREFERRED EMBODIMENT

Figure 4:
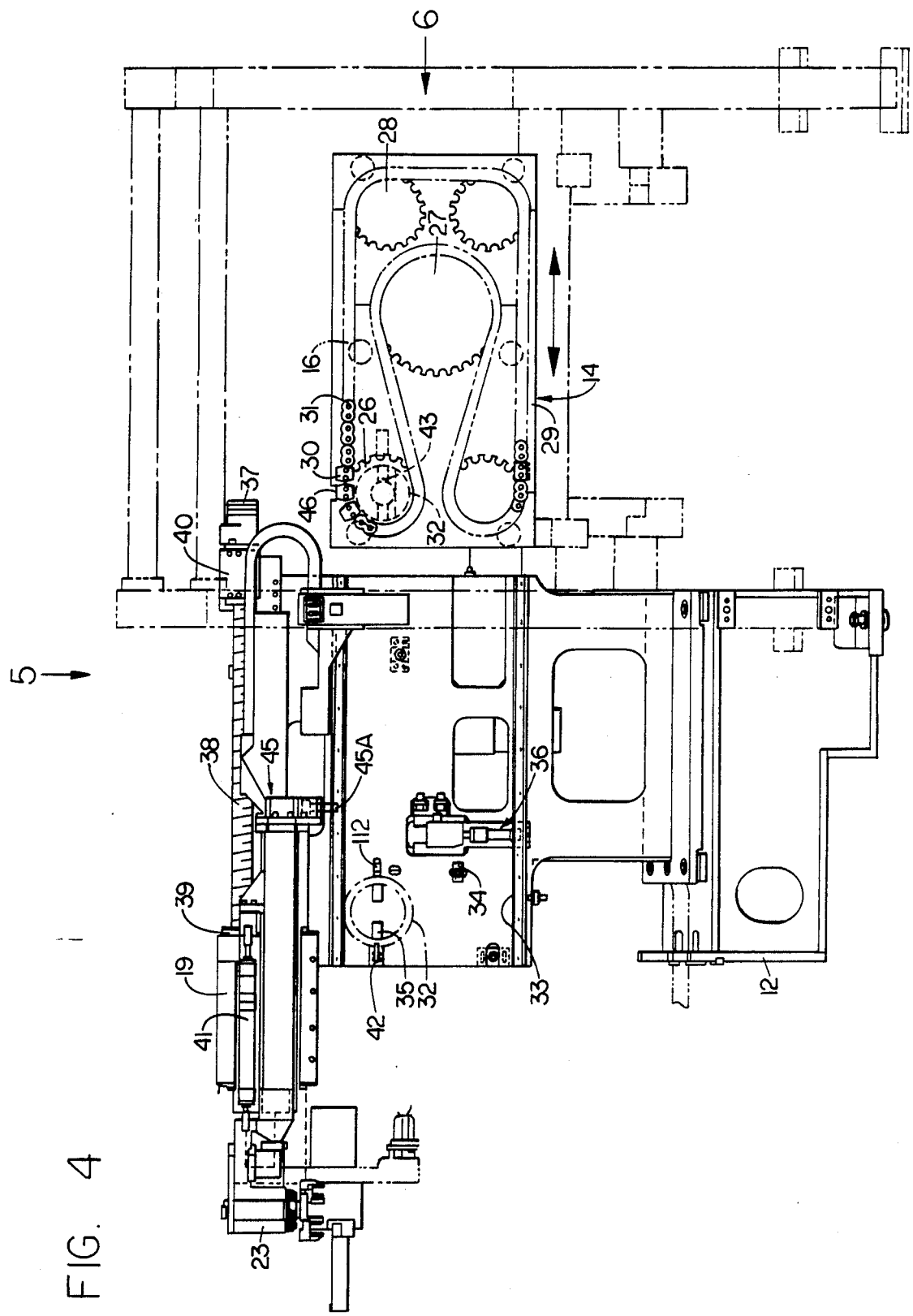
FIG. 4 is an enlarged front elevational view of the tool changer mechanism of FIG. 1.

FIG. 1 is a front elevational diagrammatic view of a turning machine 10 utilizing an automatic tool changer mechanism 11. The tool changer mechanism 11 is comprised of a tool changer base 12 which is affixed to the right end 13 of the machine 10, and the tool changer base 12 carries a tool storage magazine 14 which may be removed from the tool changer base 12 and replaced with a different tool storage magazine 14. The tool changer base carries a tool changer slide assembly 15 at its topmost point, to interchange the tools between a tool storage chain 16 and a tool turret 17 on the machine 10. The slide assembly 15 consists of a rectangular elongated slide way 18 affixed to the tool changer base 12, and a primary slide 19 is movable along the way 18. The primary slide 19 carries a secondary slide 20 in front, which is an elongated rectangular shaped member, and the secondary slide 20 supports and carries an interchange arm assembly 21. Referring to FIG. 2 in connection with FIG. 1, the interchange arm assembly 21 is shown in position to pick a new tool from the tool chain 16, and the phantom position shows that the primary slide is first moved to the phantom position "A" shown. The nonrotated position of the interchange arm assembly 21 positions the gripping fingers 22 of the interchange arm assembly 21 in a position to interchange external turning tools with the tool turret 17. Thereafter, the secondary slide can move the interchange arm housing to a position "B" where the interchange arm housing 23 can be pivoted about a pivot point 24 on the secondary slide 20, so that internal turning tools (not shown) may be exchanged with the turret 17. The right end 13 of the machine 10 in FIG. 1 shows a motorized unmanned cart 25, which is commerically available under the name Robocarrier, from the Eaton Kenway Corp., for cruising through an unmanned machining system and attending machines. The cart 25 can bring a new array of tools to the machine 10 and accomplish the interchange of a first tool storage magazine 14 with a fresh tool storage magazine 14 without the need for manual intervention. It may be appreciated, however, that the tool storage magazine 14 may be slid from the tool changer base 12 manually and positioned on any suitable table or support.

FIG. 3 depicts the right end view of the machine 10 of FIG. 1 illustrating the tool changer base 12, slide way 18, primary slide 19 and secondary slide 20. The tool storage magazine 14 is shown with the chain 16 trained around support sprockets 26,27,28.

Toolchanger Base Assembly

FIG. 4 depicts the tool changer base 12 in more detail, showing the tool storage magazine 14 removed from the base 12. The tool storage magazine 14 is seen to be generally a plate-like support 29 having a roller 16 chain serpentine-wound around support sprockets 26,27,28, and the chain 16 carries tool holders 30 attached to its links 31. The tool storage magazine has a drive sprocket 26 for propelling the tools along their circuit, and the drive sprocket 26 is engageable with an index mechanism 32 supported on the tool changer base 12. A stop block 34 is provided to locate the magazine 14. The tool storage magazine 14 is received on tracks 33 on the base 12 and is guided thereon by keys 35. Once in position, the tool storage support 29 is locked by a magazine clamp assembly 36 which will be detailed later. The primary slide 19 is propelled along the fixed slide way 18 by a hydraulic motor 37 and screw 38 assembly which is threadably engaged with a nut 39 on the primary slide 19. The hydraulic motor 37 is affixed to its housing 40 on the tool changer base 12. The interchange arm housing 23 is shown having its gripping fingers 22 in position to pick up an OD turning tool. The interchange arm housing may be further advanced to the left by the secondary slide 20 and rotated to the turn around position (see FIG. 2) by the cylinder unit 41 affixed to both the housing 23 and secondary slide 20. The index mechanism 32 is oriented with its drive keys 35 in a horizontal position, and the position is sensed by proximity switches 42. The drive sprocket 26 on the tool storage magazine 14 has a complementary key way 43 and the key way 43 is received on the drive keys 35 of the index mechanism 32. The tool storage magazine 14 is latched in position with the cart 25 by a latching mechanism 44 shown in phantom at the rear of the magazine 14 which will be detailed later.

The secondary slide 20 carries a magazine finger assembly 45 at its end, and the assembly has a magazine finger 45(a) which is powered up and down hydraulically. When powered down, the finger 45(a) engages a slot 46 in the support 29 of the magazine 14. The screw 38 then drives the magazine 14 out of the tool changer base 12. An entering magazine 14 is similarly brought into the base 12 by the screw 38 and finger 45(a).

Figure 5:
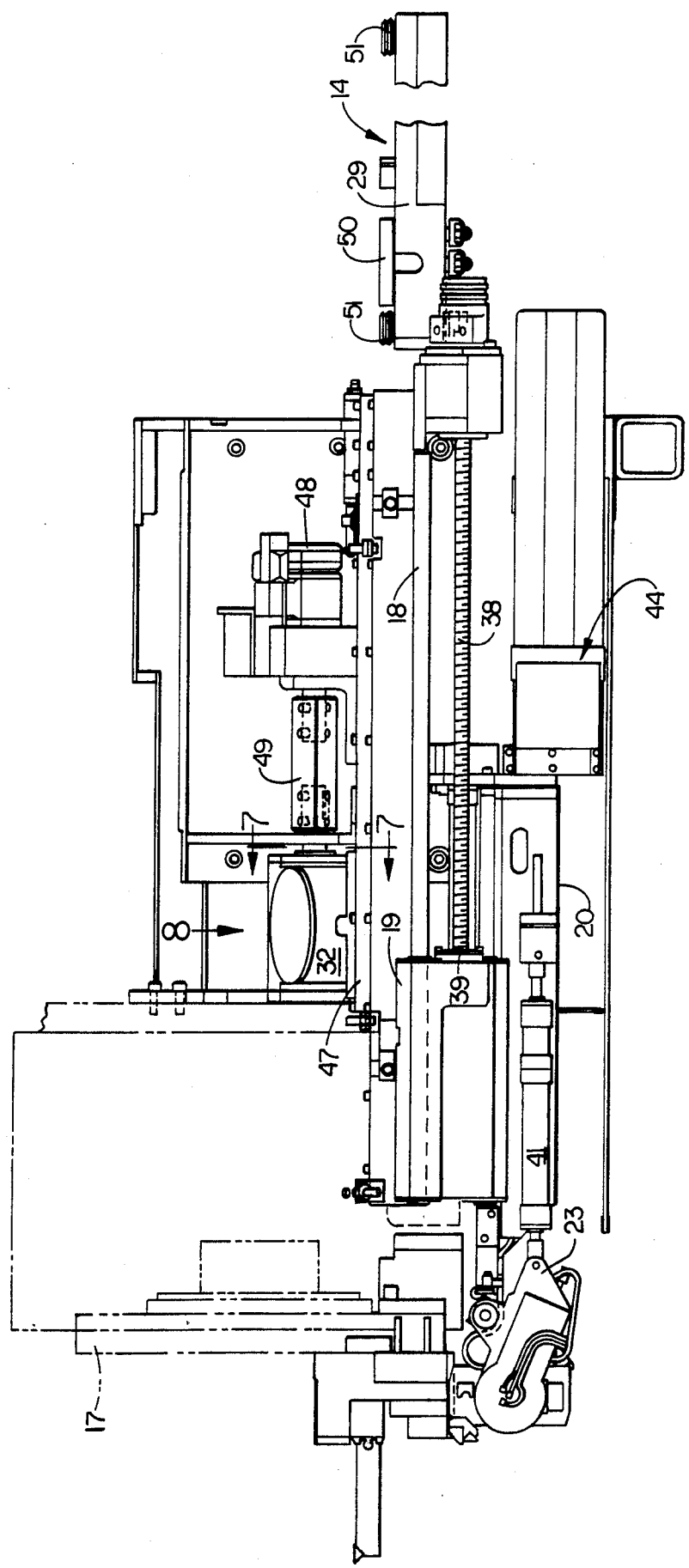
FIG. 5 is a plan view taken in the direction of arrow 5 of FIG. 4.
Figure 6:
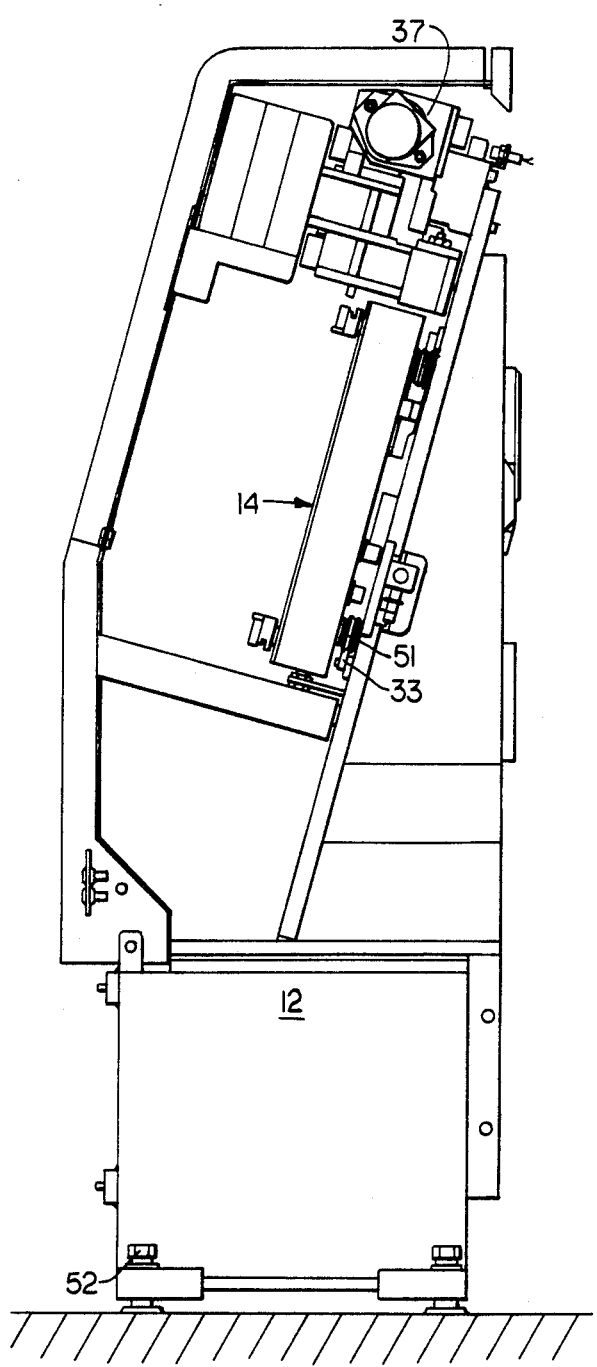
FIG. 6 is a right side elevational view taken in the direction of arrow 6 of FIG. 4.

FIG. 5 is a plan view of the elements of FIG. 4, illustrating in more detail, the drive screw 38 for propelling the primary slide 19 along its way 18, and the interchange arm housing 23 is shown in the non-rotated position, affixed to the turn around cylinder unit 41. The drive screw 38 is threadably received in the nut 39 of the primary slide 19. The index mechanism 32 is shown affixed to the rear wall 47 of the tool changer base 12, and is driven by a hydraulic motor to a suitable coupling 49. The magazine finger assembly 45 is affixed to the end of the secondary slide 20. The tool storage magazine 14 is shown removed from the assembly and having the nose 50 of its drive sprocket 26 extending from the support 29. Support rollers 51 are affixed to the tool storage magazine 14 and have a V-groove machined therein for tracking the assembly. The right end of the machine is depicted in FIG. 6, wherein the V-shaped rollers 51 of the tool storage magazine 14 are shown in alignment with V-shaped tracks 33 on the tool changer base 12. The tool changer base 12 is supported on leveling screws 52 on the floor, in a similar fashion to that of the machine supports (not shown). The hydraulic drive motor 37 is shown for propelling the primary slide 19 back and forth.

Figure 7:
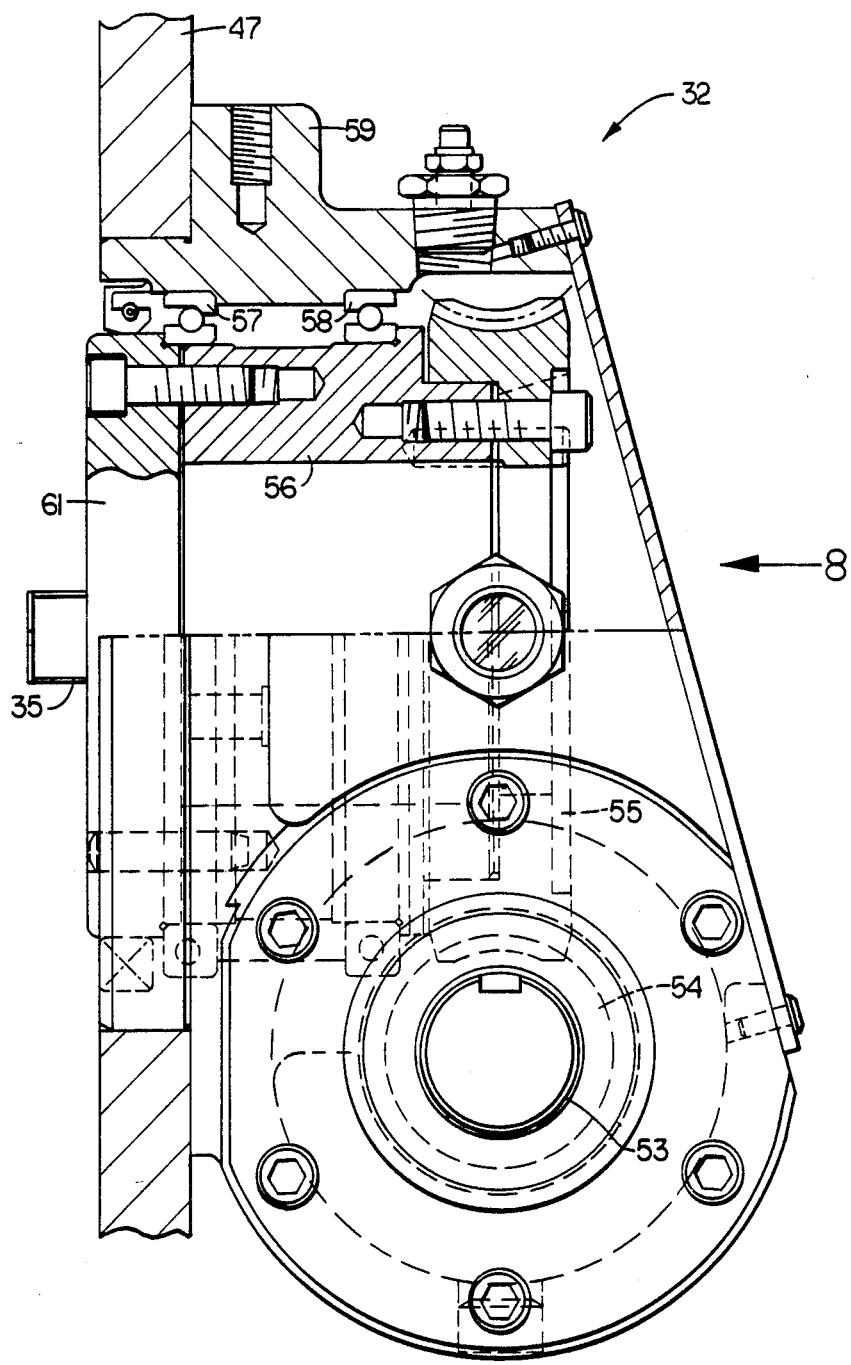
FIG. 7 is a side view in partial section of the index mechanism.
Figure 8:
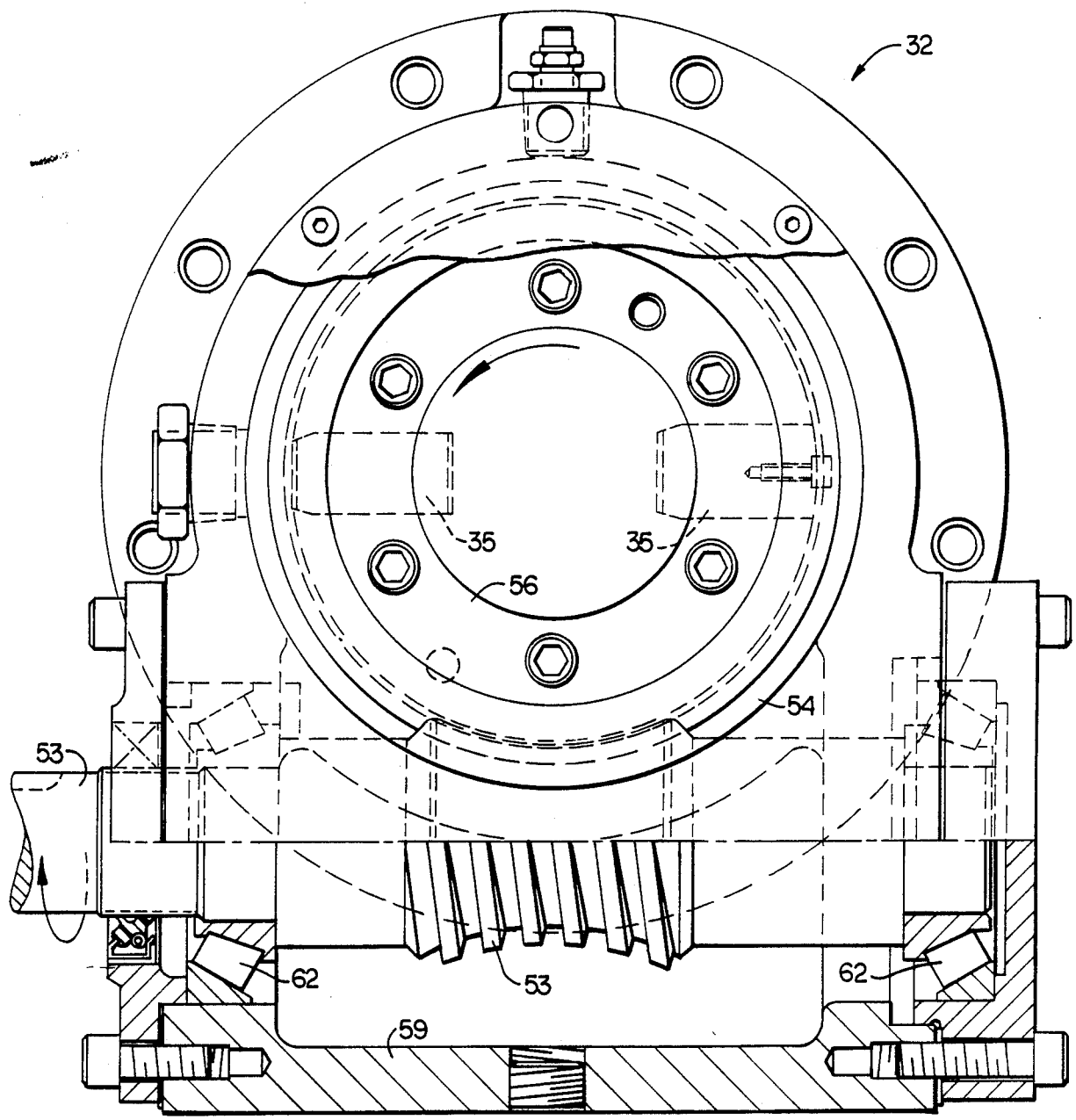
FIG. 8 is an end view in partial section of the index mechanism taken in the direction of arrow 8 of FIG. 7.

FIG. 7 is a partial broken-away section through the index mechanism 32, showing an end view of the input shaft 53 which is affixed to a worm 54 driving through reduction to a worm wheel 55. The worm wheel 55 is affixed to an index spindle 56 supported in bearings 57,58 within the index housing 59. The index housing 59 is flange-mounted to the rear wall 47 of the tool changer base 12 and supported on a pilot diameter 60 in the base 12. The front of the index spindle is fitted with a spindle nose 61, having a pair of drive keys 35 thereon for driving the tool chain 16. FIG. 8 is a rear partial broken-away view of the index mechanism 32, illustrating the input shaft 53 and worm/wheel units 54,55. The input shaft 56 is supported in roller bearings 62 at each end of the index housing 59. The drive keys 35 are shown dotted, at the front of the index mechanism 32.

Primary and Secondary Slide Assemblies

Figure 9:
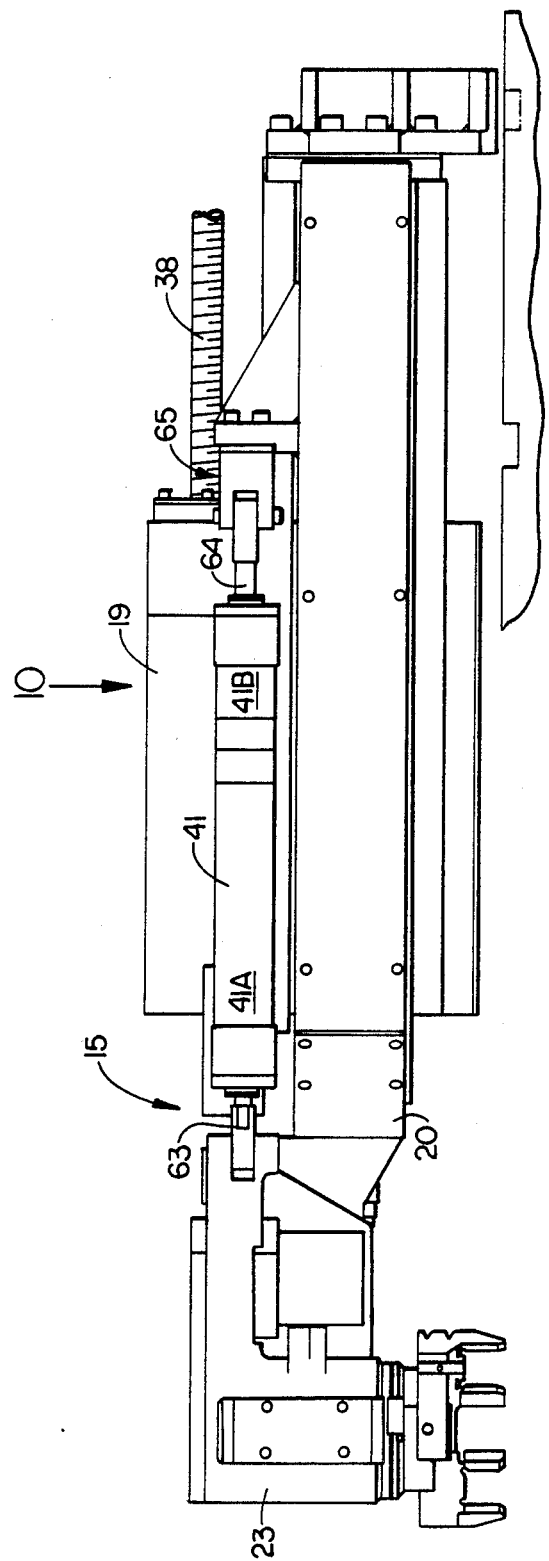
FIG. 9 is a front elevational view of the slide assemblies.

FIG. 9 is an elevational view of the tool changer slide assembly 15 in more detail showing the drive screw 38 for propelling the primary slide 19, and the cylinder unit 41 for turning the interchange arm housing 23 around. The cylinder unit 41 is a tandem cylinder device having a piston rod 63 extending from its primary section 41(a) where the piston rod 63 is clevis-mounted to the interchange arm housing 23, and a shorter piston rod 64 extends from its secondary section 41(b) and is clevis-mounted to the secondary slide 20 through a clevis bracket assembly 65. The stroke of the primary section 41(a) serves to swing the interchange arm housing 23 around to the front plane of the turret 17 and the second, piggyback stroke of the secondary section 41(b) of the cylinder unit 41 serves to provide a short additional stroke, when required, for rocking the interchange arm housing 23 to a point where the tools will not intrude with the tool turret mounting blocks which will be discussed later.

Figure 10:
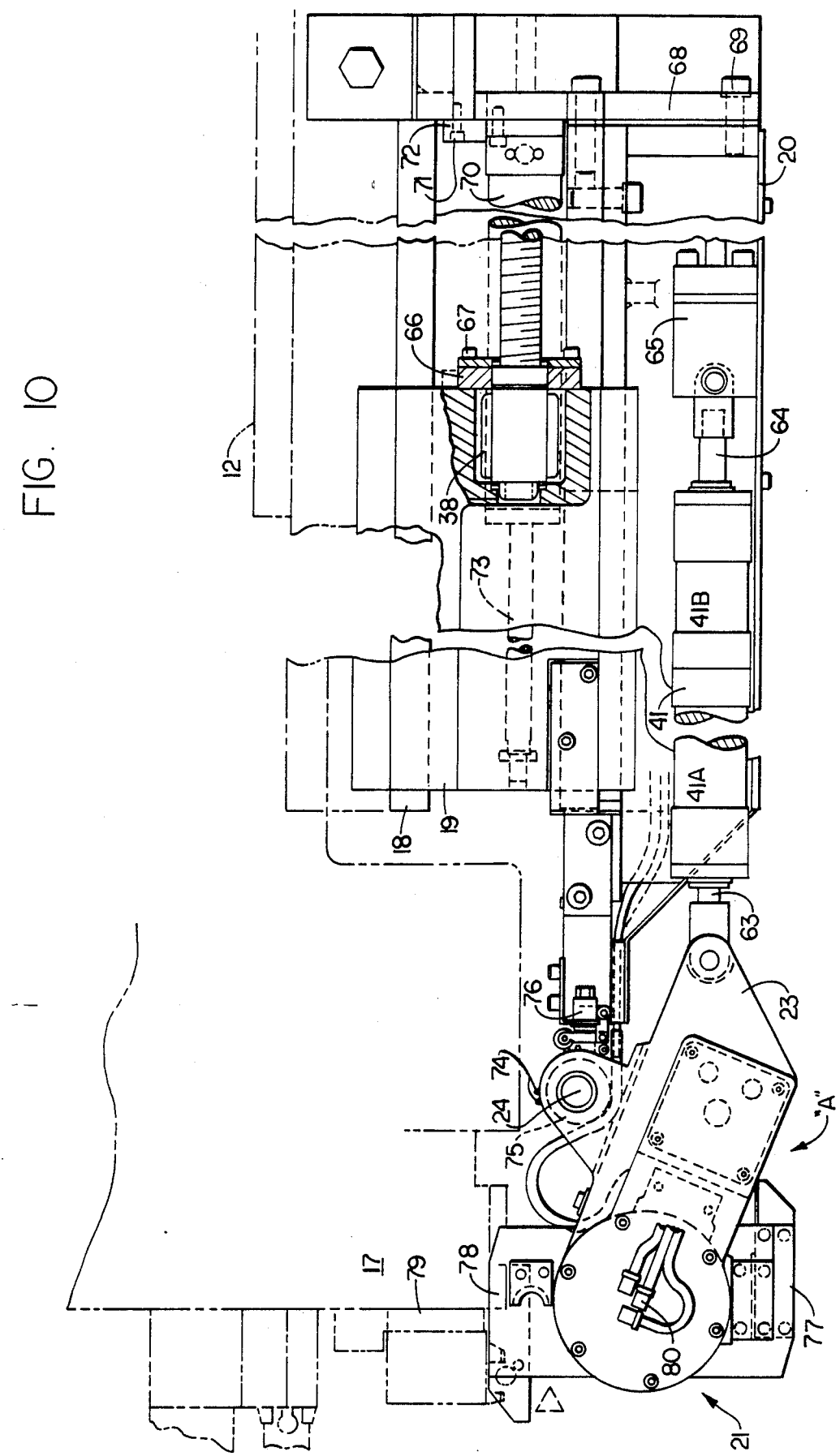
FIG. 10 is a plan view of the slide assemblies taken in the direction of arrow 10 of FIG. 9.

The plan view of FIG. 10, shows that the drive screw 38 is of the ball type, having its ball nut flange 66 affixed to the primary slide 19 by a plurality of screws 67. The primary slide 19 is carried on the rectangular slide way 18, which is affixed to the tool changer base 12. The secondary slide 20 has an end plate 68 secured thereto by a plurality of screws 69, and the end plate 68 has a fluid cylinder 70 secured thereto by screws 71 through a cylinder flange 72, and the piston rod 73 of the cylinder 60 is tied to the primary slide 19 at a side opposite the nut 39. Thus it can be seen, that the primary slide 19 functions as a relative base for the secondary slide 20, so that as fluid is ported into the cylinder 70, the second slide 20 will move with respect to the primary slide 19. The primary slide 19 is driven to its end position by the drive screw 38, to interchange OD turning tools. To interchange ID turning tools, the interchange arm 23 must be positioned further on for its turn around stroke. The secondary slide movement cylinder 70 accomplishes this furtheron positioning relative to the primary slide 19. The turn around cylinder 41 is shown clevis-mounted to its bracket 65 secured to the secondary slide 20, and secured to the interchange arm 23. The interchange arm assembly 21 carries a plurality of cams 74 affixed to a cam block 75 on the pivot point 24, and the cams 74 are used to trip a plurality of air limit switches 76 carried by the secondary slide 20, to sense pivoted positions of the interchange arm housing 23. As stated previously, the primary stroke portion 41(a) of the cylinder unit 41 is used to swing the interchange arm around its pivot point 24, when it is desired to change ID turning tools, and, after the secondary slide has been advanced to its proper position (not shown in FIG. 10). However, in either the ID tool position "B" or the OD tool position "A", shown in solid, it may be seen that the rectangularly shaped faces 77,78 of the interchange arm housing 23 would strike the tool holder block 79 of the turret 17. If the gripping fingers 22 were rotated. The secondary stroke portion 41(b) of the cylinder unit 41 serves to provide a slight rocking movement to the interchange arm housing 23 (in a rearward direction) to swing the gripper pivot point 80 out slightly so the gripper fingers 22 may be rotated without striking the tool block 79. Once rotated, the gripper fingers 22 are repositioned by the piggyback jump stroke to the solid position shown.

Tooling

Figure 11:
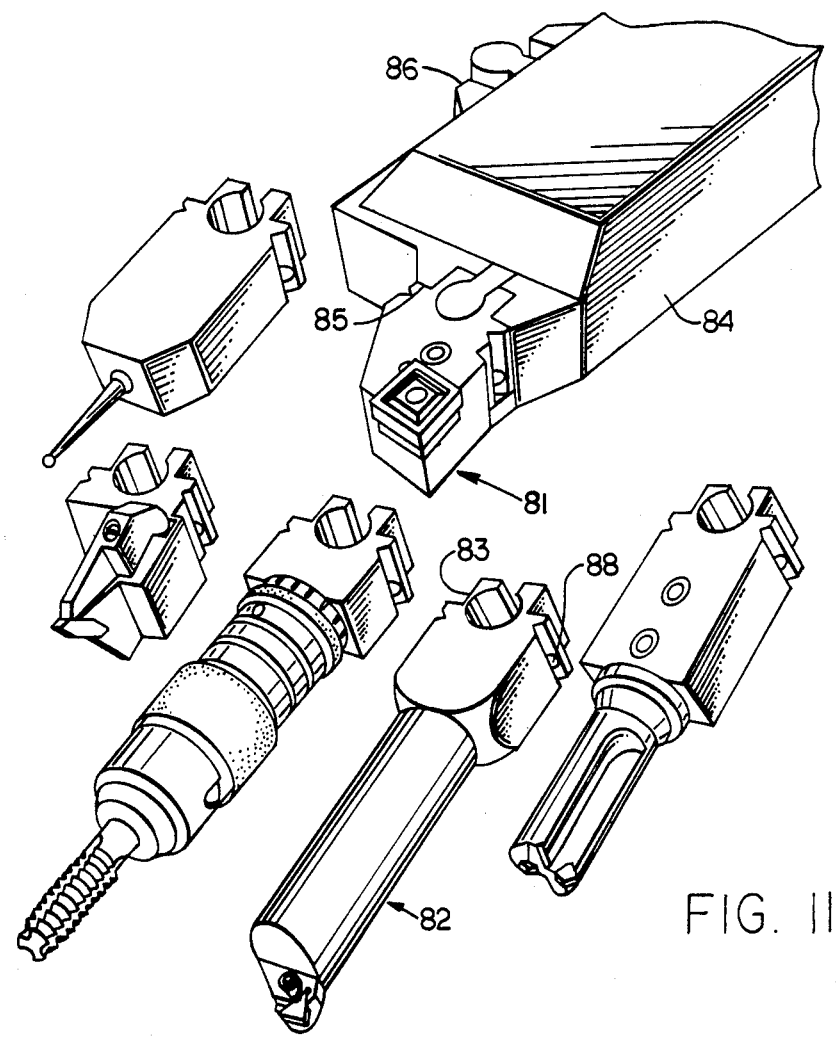
FIG. 11 is a view of assorted tools having a common base section.
Figure 12:
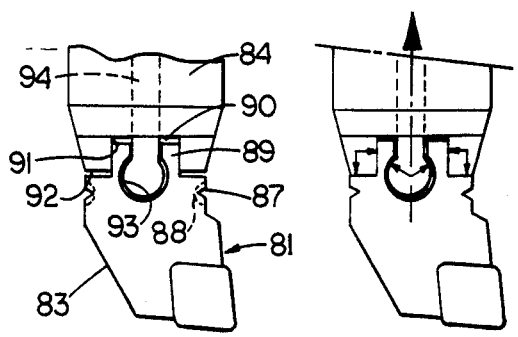
FIG. 12 is a plan view of a tool locking and locating system.
Figure 13:
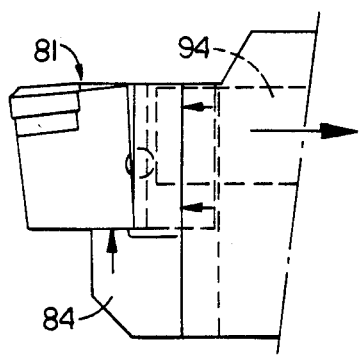
FIG. 13 is a side elevational view of a tool locking and locating system.

FIG. 11 depicts an assortment of tools which might be employed on a turning machine, including an OD turning tool 81 and an ID turning tool 82, or boring tool. The tools are designed with a common locking and locating section 83. Although different types of common tool bases may be employed, the style depicted is the tool base disclosed in U.S. Pat. No. 4,270,422, of Andersson, and available commercially from the Sandvik Co. A dual tool mounting block 84 is depicted, where an OD tool mounting surface 85 is at 90 degrees to an ID tool mounting surface 86. V-shaped guide grooves 87 are cut along the sides of the tool to guide gripping fingers of an automatic tool changer. A ball identation 88 is provided in the groove 87 to enable the gripping fingers to grip the part securely. FIG. 12 illustrates the common locking and locating section 83 of a typical OD turning tool 81, where a rectangular guide section 89 is received in a guideway 90 of a tool block 84, having side guide surfaces 91 and front flat locating surfaces 92. The tool 81 has cooperating surfaces so that the tool 81 may be shouldered against the front flat surfaces 92 of the tool holder 84. A central keyhole-shaped slot 93 is provided through the tool 81, having an enlarged circular central portion and a narrower portion extending through the bottom of the tool 81. The tool holder 84 is equipped with a key 94 which fits into the key slot 93 of the tool 81. When the key 94 is withdrawn into the tool holder 84 in the direction of the large arrow, the tool 81 will be securely loaded against its mounting surfaces at the points indicated by the small arrows, thus providing a secure assembly for subsequent machining operations. FIG. 13 likewise depicts that the key 94 is drawn in the direction of the large arrow, to secure the tool holder in position on the front flat surfaces of the tool holder, and on the bottom locating surface of the tool as well.

Tool Storage Magazine

Figure 14:
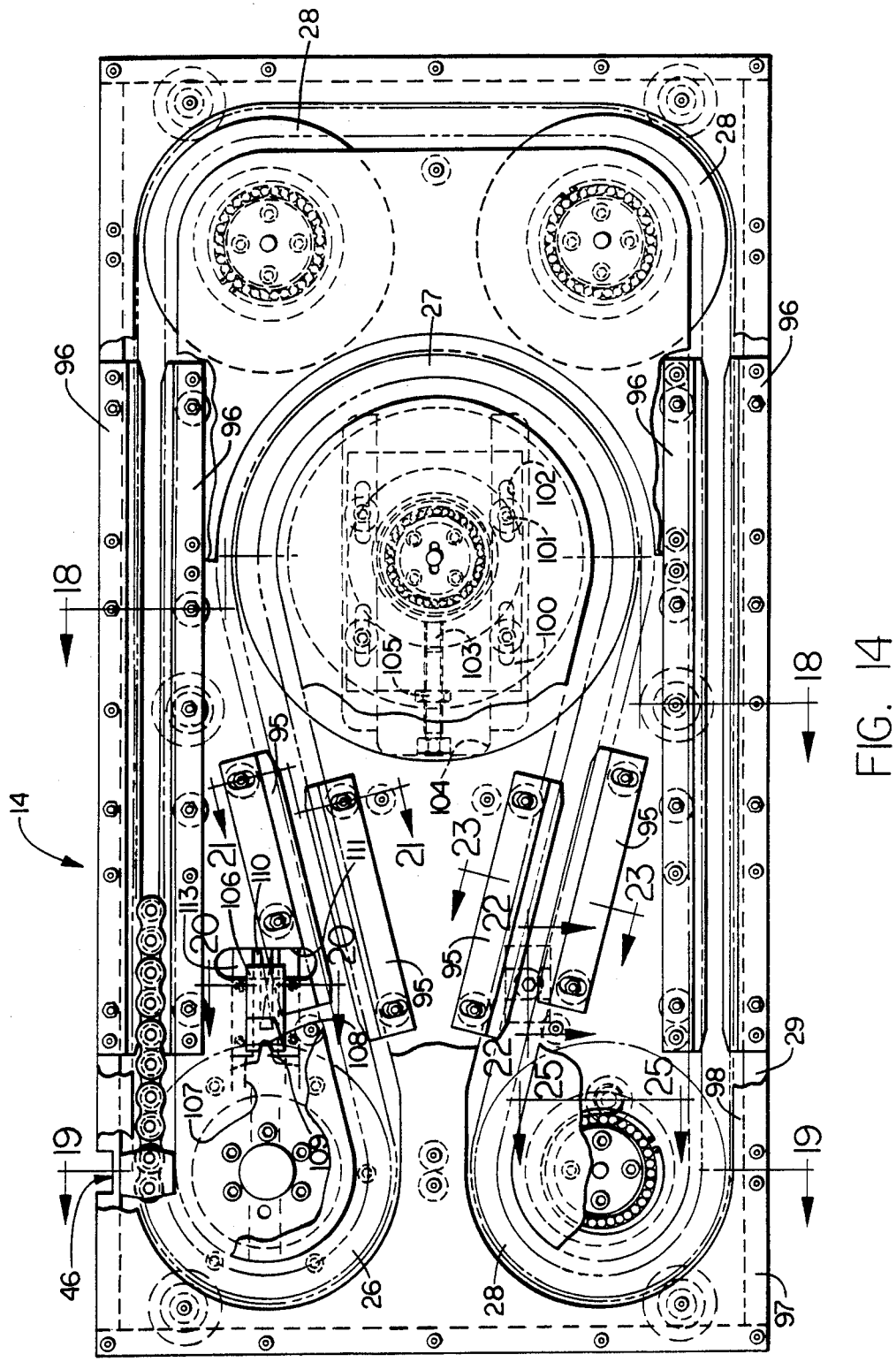
FIG. 14 is a front elevational view of the tool storage magazine.

Referring to the front elevational view of FIG. 14, the tool storage magazine 14 is depicted, wherein the assembly has a base plate support 29, and a roller chain 16 is trained around a plurality of sprockets, including a drive sprocket 26, three idler sprockets 28, and a large, central, tension-adjusting sprocket 27. Guide rails 95,96 are provided to prevent the assembly from sagging. A cover 97 is provided having a cut-out opening 98 through which the roller chain 16 may be observed. The roller chain 16 carries a plurality of tool holders 30 which are affixed to the link pins 99 of the roller chain 16 and which will be discussed further in connection with FIGS. 15, 16 and 17. The idler sprockets 28 are journalled for rotation with the base plate support 29, and the tension-adjusting sprocket 27 is mounted to a slidable block 100 which is secured to the base plate support 29 by screws 101 received in elongated slots 102. The adjusting block 100 is moved by an adjusting screw 103 which is received in the block 100 and the head of the adjusting screw 103 is abutted against a relieved portion 104 in the base plate support 29. Thus, when the adjusting screw 103 is rotated, the head is thrust against the relieved portion 104, forcing the adjusting block 100 away from the screw head. A jam nut 105 is provided to lock the assembly from further adjustment. The drive sprocket 27 is retained in a locked position during transport of the tool storage magazine 14 by a detent block 106, which is guided in a slot 107 machined through the base plate support 29. The detent block 106 has a V-groove 108 which engages one sprocket tooth 109, to keep the sprocket 26 from rotating. The detent block 106 is forced into engagement by a spring 110 reacting against a side wall of an adjacent slot 111 in the base plate support 29 and, when the magazine 14 is loaded into the tool changer base 12 (index mechanism 32 engaged with the drive sprocket 26) the detent block 106 is forced out of engagement with the sprocket tooth 109 by a block 112 on the tool changer base 12 (see FIG. 4) which cams the detent block 106 back. The detent block 106 is prevented from falling out of the base plate support 29 by a pair of side guide plates 113 which are mounted in slots 114 in the detent block 106 and are affixed to the rear of the base plate support 29 by screws 115. The V-shaped rollers 51 are secured to the rear of the base plate support 29 by shafts 116 which are secured by screws 117 and washers 118 (FIG. 18).

Figure 17:
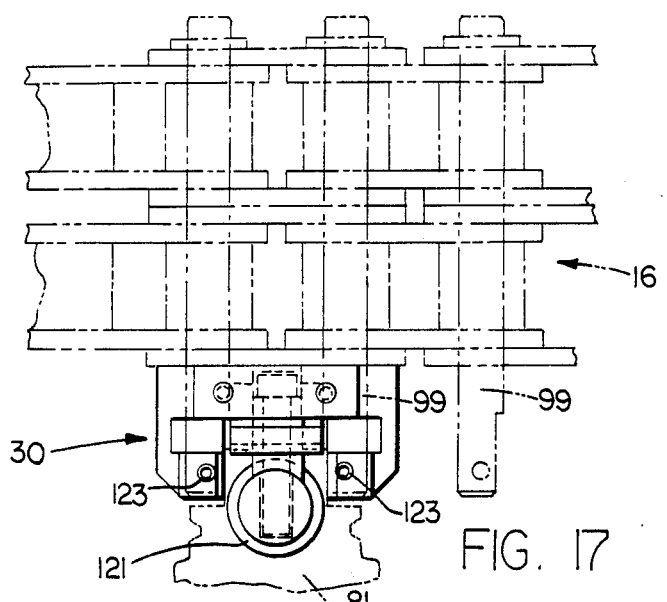
FIG. 17 is a plan view of the tool holder taken in the direction of arrow 17 of FIG. 15.
Figure 15:
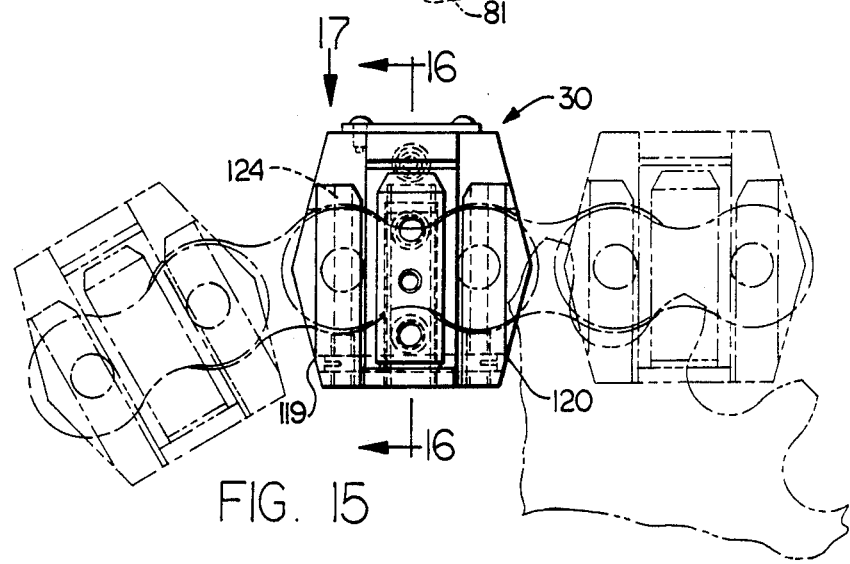
FIG. 15 is a front elevational view of a common tool holder.
Figure 16:
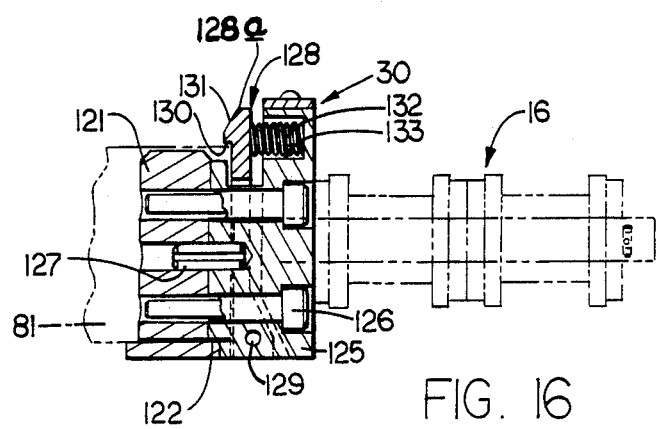
FIG. 16 is a section through the tool holder taken along the line 16—16 of FIG. 15.

FIG. 15 depicts the tool holders 30 that are carried by the roller chain link pins 99. The tool holders 30 are angled off on their side faces 119,120, to prevent striking one another as they travel their chordal paths around the sprocket 26. The plan view of FIG. 17 shows that the tool holder 30 has a central circular pin 121 to receive the circular key hole slot of a typical tool 81. The locating pin 121 is affixed to a central angular key portion 122. The tool holder 30 is slotted to receive the locating section of the tool 81. A pair of spring pins 123 are inserted through holes 124 in the tool holder 30 and extend through the link pins 99 of the roller chain 16. The sectional view of FIG. 16 illustrates that the central locating pin 121 is secured to the tool holder base 125 by a pair of cap screws 126, and a locating spring pin 127. The central key portion 122 is likewise retained to the tool holder base 125. A latching lever 128 is free to pivotally move around a pivot pin 129 which passes through the tool holder base 125, and the latching lever 128 has a hook portion 128(a) at its topmost end, having a flat locking retaining face 130 so that a tool 81 cannot move up once latched in assembly, and a cam surface 131 at its outermost end to permit the entry of a tool 81. As a tool 81 is moved downward against the cam surface 131, the latching lever 128 is pivoted towards the tool holder base 125, overcoming a compression spring 132 which reacts against the lever 128 and is located in a counterbored hole 133 in the tool holder base 125. The tool 81 rests on a head 134 at the bottom of the pin 121, which is an integral part of the locating pin 121. While the tool holder 81 is depicted as a multipart assembly of metal parts, it may be appreciated that the assembly can be made of integrally molded components, wherein all counterbored holes can be molded into the assembly and the latching lever 128 may be a separate molded component as well.

Figure 18:
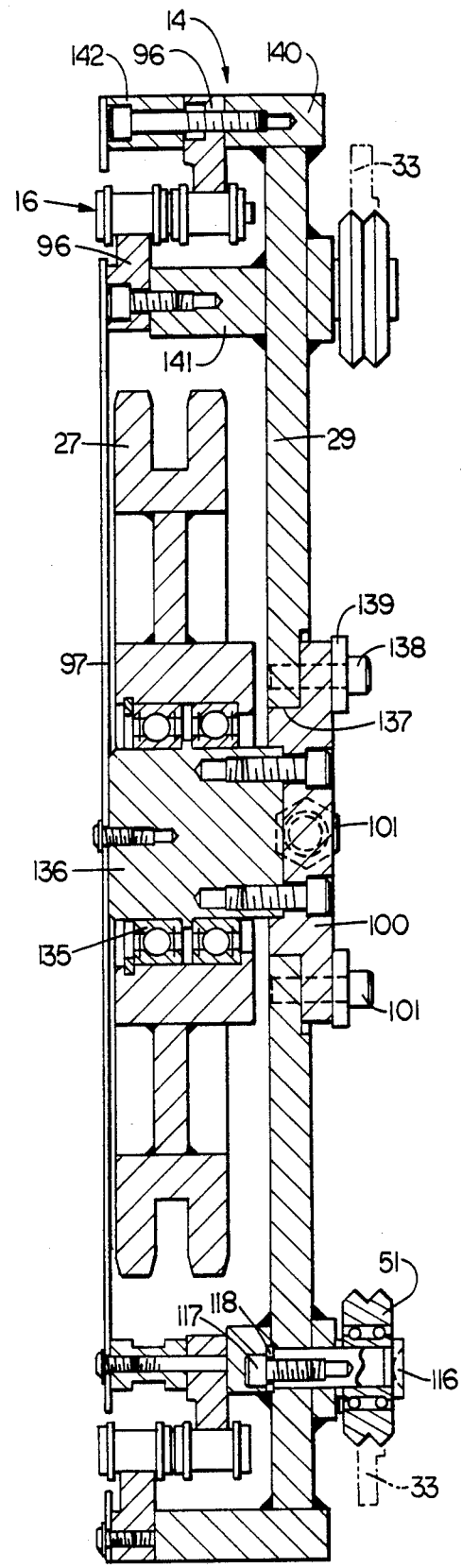
FIG. 18 is a side elevational section through the tool storage magazine taken along the line 18—18 of FIG. 14.

The sectional view of FIG. 18 shows the tool storage magazine 14 having its base plate support 29 and its base-mounted V-shaped rollers 51, supported on their respective slide ways 33. The tension-adjusting sprocket 27 is rotatably carried on bearings 135 which are mounted to a stud 136, which in turn, is mounted to the slidable adjusting block 100. The adjusting block 100 is guided in a slot 137 in the base plate support 29, and is retained by a plurality of cap screws 138 and washers 139. The adjusting screw 101 is shown dotted at the opposite end of the tension-adjusting block 100. The support 29 is provided with 90 degree upstanding walls 140,141, at varying heights, to which are secured the roller chain guides 95. Adapter blocks 142 are provided on the guides 95, to bring the front level of the assembly out to a common dimension, i.e., equal to the height of the tension-adjusting sprocket locating stud 136. The front cover 97 is secured to the stud 136, spacers 142, and guides 95.

Figure 19:
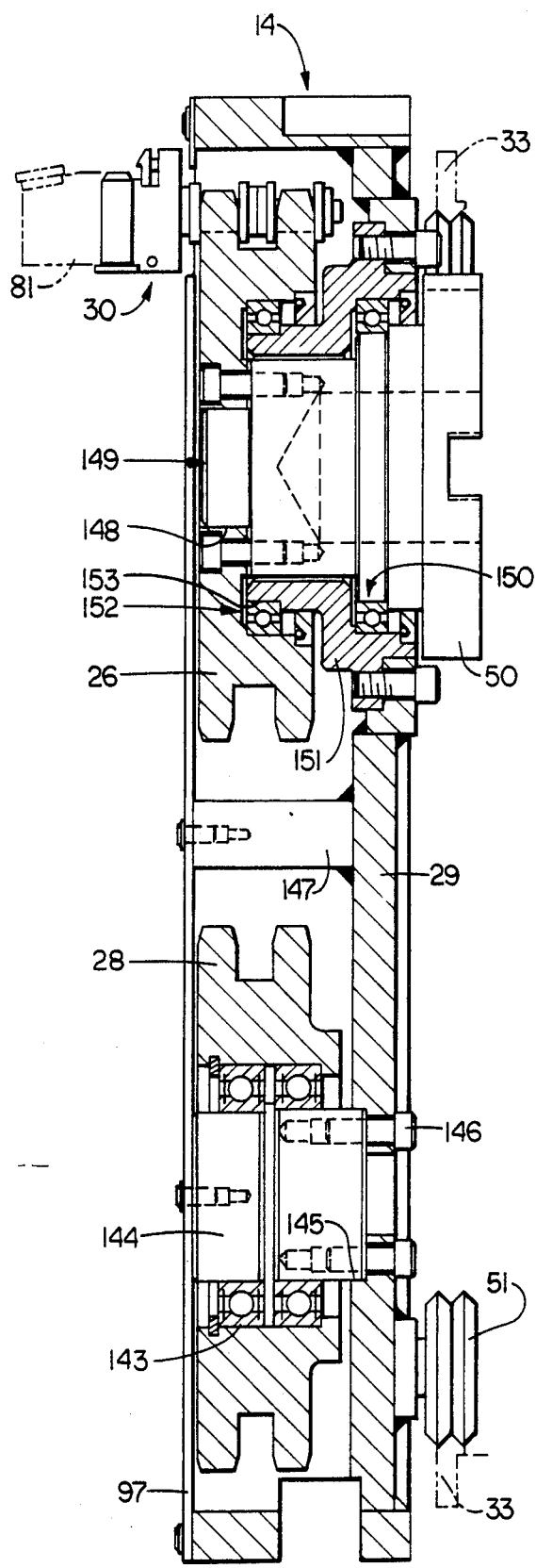
FIG. 19 is a side elevational section of the tool storage magazine taken along the line 19—19 of FIG. 14.

FIG. 19 illustrates a section through the drive sprocket 26 and an idler sprocket 28 of the tool storage magazine 14. The idler sprocket 28 at the bottom of the figure is rotatably carried on a pair of ball bearings 143 which are carried by a fixed stud 144. The stud 144 is received in a counterbore 145 in the base plate support 29 and is locked thereto by cap screws 146. The cover 97 is likewise secured to the idler adjusting stud 144. A central wall 147 is provided to support the cover 97. The drive sprocket 26 is shown located on a pilot diameter 148 of a driving spindle 149, which is stepped progressively upward from the pilot diameter 148 to its sprindle nose 50 at the rear of the assembly. The spindle nose 50 has a driving key way 43 machined across its face. The spindle 149 has a bearing diameter 150 which is received in the inner race of a support bearing 151 carried in a support ring 152, which in turn is fastened to the base plate support 29. The sprocket 26 has a counterbore 152 which receives the outer race of a support bearing 152, and the inner race of the bearing 152 is carried on a cantilevered diameter 153 of the support ring 151.

Figure 20:
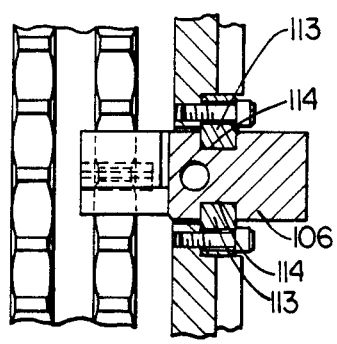
FIG. 20 is a section through the detent block taken along the line 20—20 of FIG. 14.
Figure 21:
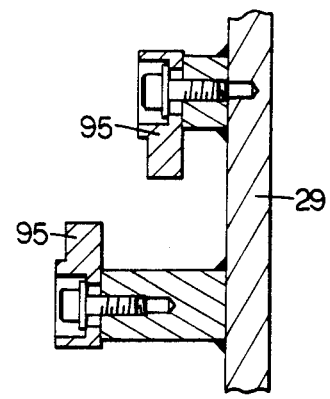
FIG. 21 is a section through the guide rails of the tool storage magazine taken along the line 21—21 of FIG. 14.
Figure 23:
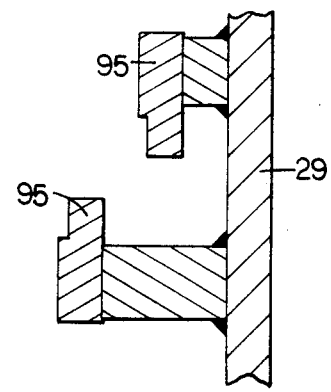
FIG. 23 is a section through the chain guide rails of the tool storage magazine taken along the line 23—23 of FIG. 14.

FIG. 20 is a section through the detent block 106 of FIG. 14, which retains the drive sprocket 26 in a locked position while the tool storage magazine 14 is in transit. FIGS. 21 and 23 depict the roller guides 95 which are secured at different levels on spacer blocks 154,155 secured to the base plate support 29.

Figure 22:
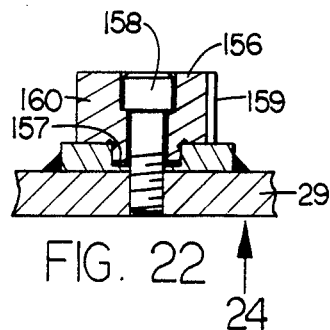
FIG. 22 is a section through the locking and locating block of the tool storage magazine taken along the line 22—22 of FIG. 14.
Figure 24:
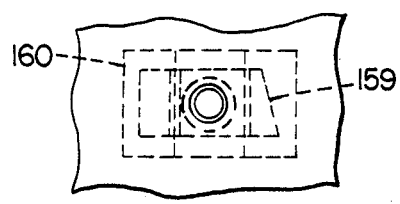
FIG. 24 is a front elevational view of the locking and locating block of the tool storage magazine, taken in the direction of arrow 24 of FIG. 22.
Figure 25:
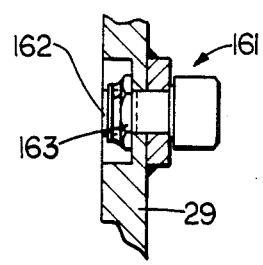
FIG. 25 is a section through the latching roller of the tool storage magazine taken along the line 25—25 of FIG. 14.

FIGS. 22 and 24 are views of locating and locking block 156 which is secured to the rear of the tool storage magazine base plate support 29. The locking and locating block 156 is received in a machined slot 157, and secured to the support 29 plate by a cap screw 158. A beveled off surface 159 is provided at one side of the block 156, and the opposite side of the block 156 is provided with a flat, square, surface 160. In assembly, the flat square surface 160 abuts the stop block 34 which is secured to the tool changer base 12 and a locking assembly 36 (FIG. 4) serves to drive the locking and locating block 156 against the stop block 34. FIG. 25 is a section through a antifriction roller 161 which has its stud 162 located in the base plate support 29 and a lock nut 163 is provided to secure the stud 162 in assembly.

Magazine Clamp

Figure 28:
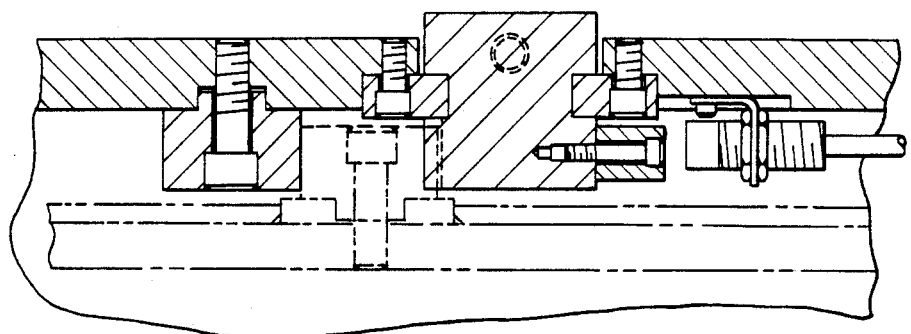
FIG. 28 is a plan section through the locking assembly taken along the line 28—28 of FIG. 26.
Figure 27:
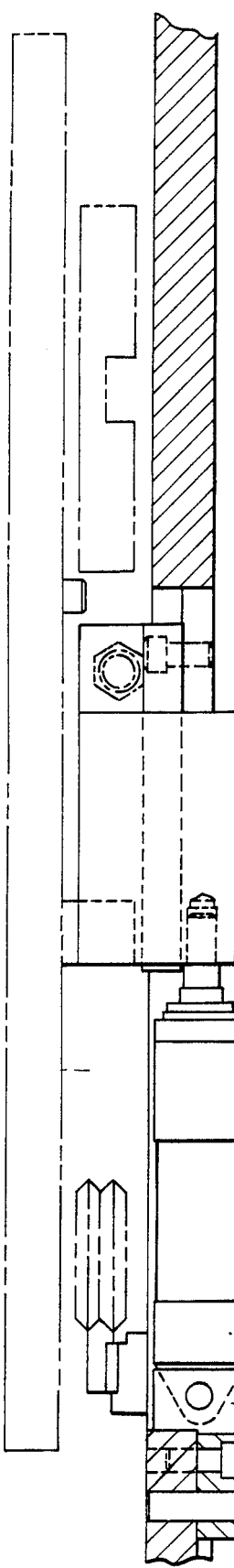
FIG. 27 is a section through the locking assembly taken along the line 27—27 of FIG. 26.
Figure 26:
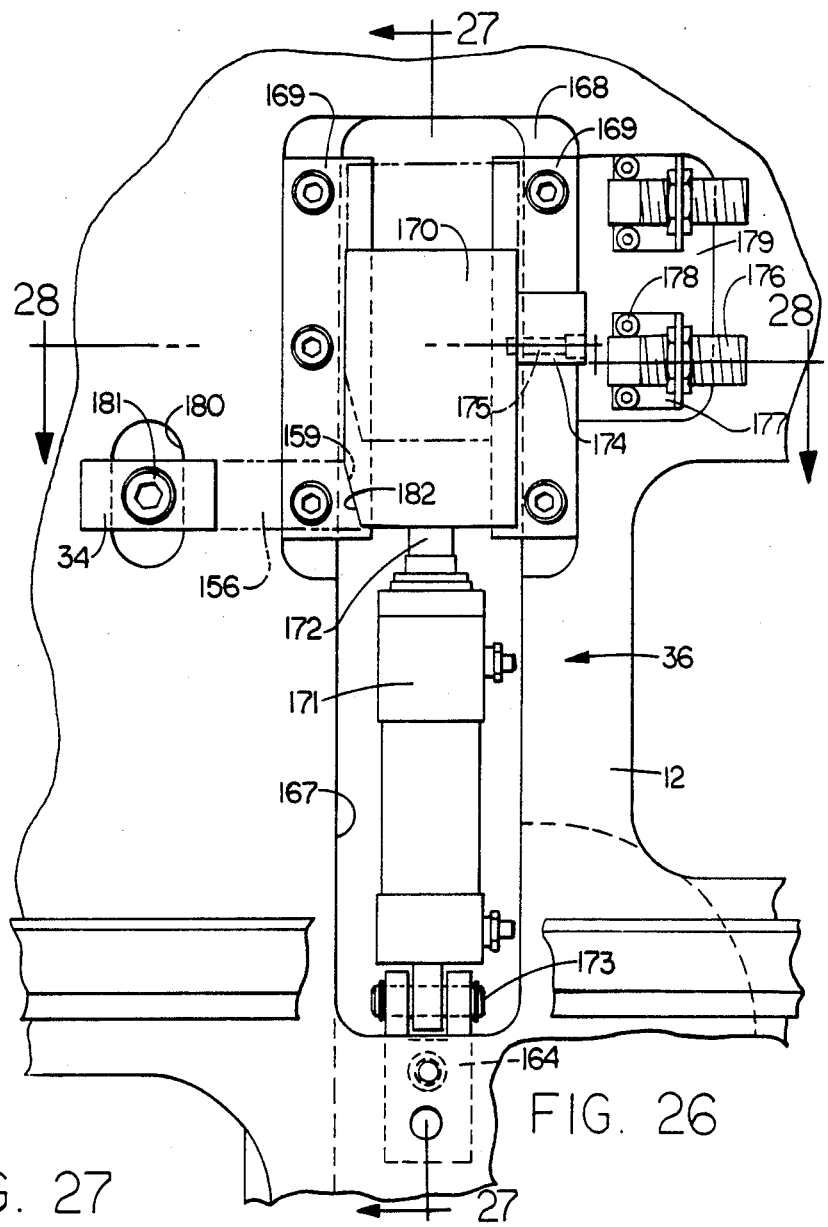
FIG. 26 is an enlarged front elevational view of the locking assembly of the tool changer base.

FIGS. 26, 27 and 28 depict the magazine locking assembly 36 of FIG. 4, wherein the tool changer base 12 has a clevis bracket 164 mounted to its rear surface by a screw 165 and a pin 166, and an opening 167 is machined through the tool changer base 12. The topmost portion of the opening is further machined to provide pads 168 for a pair of guide plates 169 mounted on opposite sides of a locking slide 170. The locking slide 170 is slidable up and down under impetus of a fluid operated piston cylinder 171. The piston rod 172 is threadably received in the locking slide, and the lower end of the cylinder 171 is clevis-mounted by a pin 173 through the clevis bracket 164. A switch actuating block 174 is secured to the side of the locking slide 170 by screws 175, and serves to alternately actuate a pair of proximity switches 176 to signify up and down positions of the slide 170. The proximity switches 176 are carried on angle brackets 177 which are secured to the tool changer base 12 by screws 178, and the brackets 177 are received in a machined area 179 of the base 12. The tool changer base 12 carries the stop block 34, which is received in a slot 180 and extends beyond the face of the tool changer base 12. The block 34 is secured in position by a cap screw 181. The locking and locating block 156 of the tool storage magazine 14 is shown in phantom, and is received against the stop block 34 when the magazine 14 is moved into position. Once in position, the locking slide 170 is actuated in a downward direction, and its ramp surface 182 engages the beveled side surface 159 of the locking and locating block 156, thus wedging the block 156 tightly in position. When it is time to remove the magazine 14 the locking slide 170 is moved to the upward position.

Interchange Arm

FIG. 29 is a section through the interchange arm assembly 21. The housing 23 has a vertically movable piston 183, which is powered to the downward position by fluid pressure, and biased to the upward position by a compression spring 184. The piston 183 is rotatable (to cause the gripper assembly 185 to rotate at the bottom of the piston rod 186), by a vane-type rotary actuator 187 which is secured to the housing 23, and the output gear 188 of the actuator 187 is driven through a rotatable idler gear 189 to the final gear 190 mounted in the cylinder 191 which carries the piston 183. The cylinder 191 has a semicircular clearance band 192 machined around its central portion, creating a pair of stop faces 193,194 which abut the adjustable stop screws 195,196 of a stop block 197 carried in the wall of the housing 23. Thus, it can be seen, that the cylinder 191 and gripper assembly 185 rotate 180 degrees to accomplish an interchange. A dual set of gripper fingers 22 are provided at opposite ends of the gripper assembly 185, for carrying the interchanged tools. The outboard portion of the housing has a clevis slot 198 machined therein, and a clevis pin 199 is received through the housing 23, which secures the turn around cylinder unit 41 (not shown) in position.

FIG. 30 is a view showing the stop block 197 received in the side wall of the housing 23.

FIG. 31 illustrates a typical set of gripper fingers 22. The gripper fingers 22 are bifurcated, having side portions 22(a)(b) which extend along the V-grooved sides of a given tool to be interchanged. Angular cam face 22(c) (FIG. 29) overcomes latching lever 128 (FIG. 16) upon descent of fingers 22. In one side portion 22(a) of the gripper fingers 22, there is received a trapped ball 200, which is backed up by a rod 201 which locks the ball 200 into a position securing a tool holder. At a selected release time, a top most piston 202 on the rod 201 is fired upward, overcoming a biasing spring 203, and allowing the detent ball 200 to go into a relief portion 204 machined around the rod 201. Air pressure is ported in through suitable air ports, to actuate the piston. The dual sets of gripper fingers 22 are identical, and grip the tools in an identical manner.

Tool Turret

Figure 32:
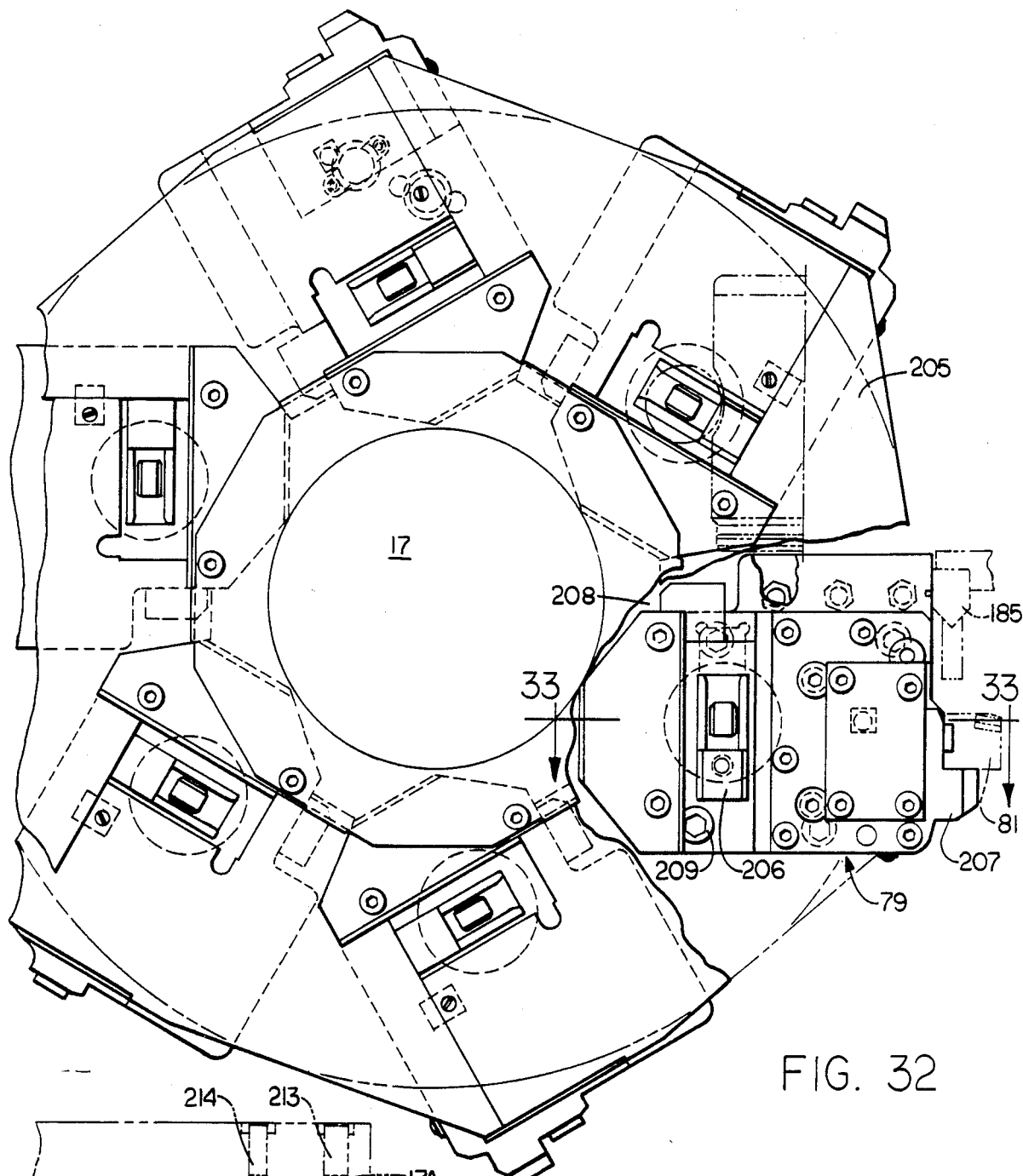
FIG. 32 is an end view of the tool turret and tool mounting block.
Figure 33:
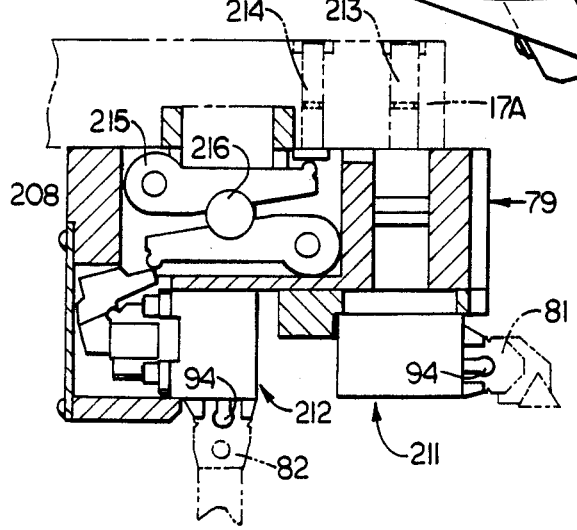
FIG. 33 is a plan section through the tool mounting block taken along the line 33—33 of FIG. 32.

FIG. 32 is a front view of the tool turret 17 of the machine 10, illustrating a cover 205 over most the assembly, and the cover 205 is broken away to illustrate a tool holder block 79 which is typical. The tool holder block 79 has a front portion 206 for receiving and locking an ID tool 82 in assembly, and a side portion 207 for receiving and locking an OD tool 81 in assembly. A gripper assembly 185 is shown above the tool 81. The central key portion of the tool holder block 79 is spring biased to a clamped position and powered under fluid pressure to a released position for the interchange of tools. The entire tool holder block 79 is secured to the turret face 208 by screws 209. Referring to FIG. 33 in conjunction with FIG. 32, a section through the tool holder block 79 is depicted, wherein the OD tool holder unit 211 is mounted to the tool holder block 79, as well as the ID tool holder unit 212. The units 211,212 are commercial packages, and the inner construction is not detailed, but it may be appreciated that an internal stack of springs are provided to bias the locking and locating key 94 to a clamp position. The locating key 94 is released by thrusting action at the rear of each unit. The thrust is provided to the units 211,212 by a pair of release pins 213,214 which are guided in the tool turret face plate 17(a) and extend into the tool holder block 79. The first release pin 213 acts directly on the OD tool holder unit 211, while the second release pin 214 is directed against a pair of pivotable links 215 carried in the tool holder block 79, to reverse directions and thereby apply the unlocking force in a proper manner against the ID tool holder unit 212. A ball 216 is provided between the links 215, to transfer the force from one link 215 to the other.

Figure 34:
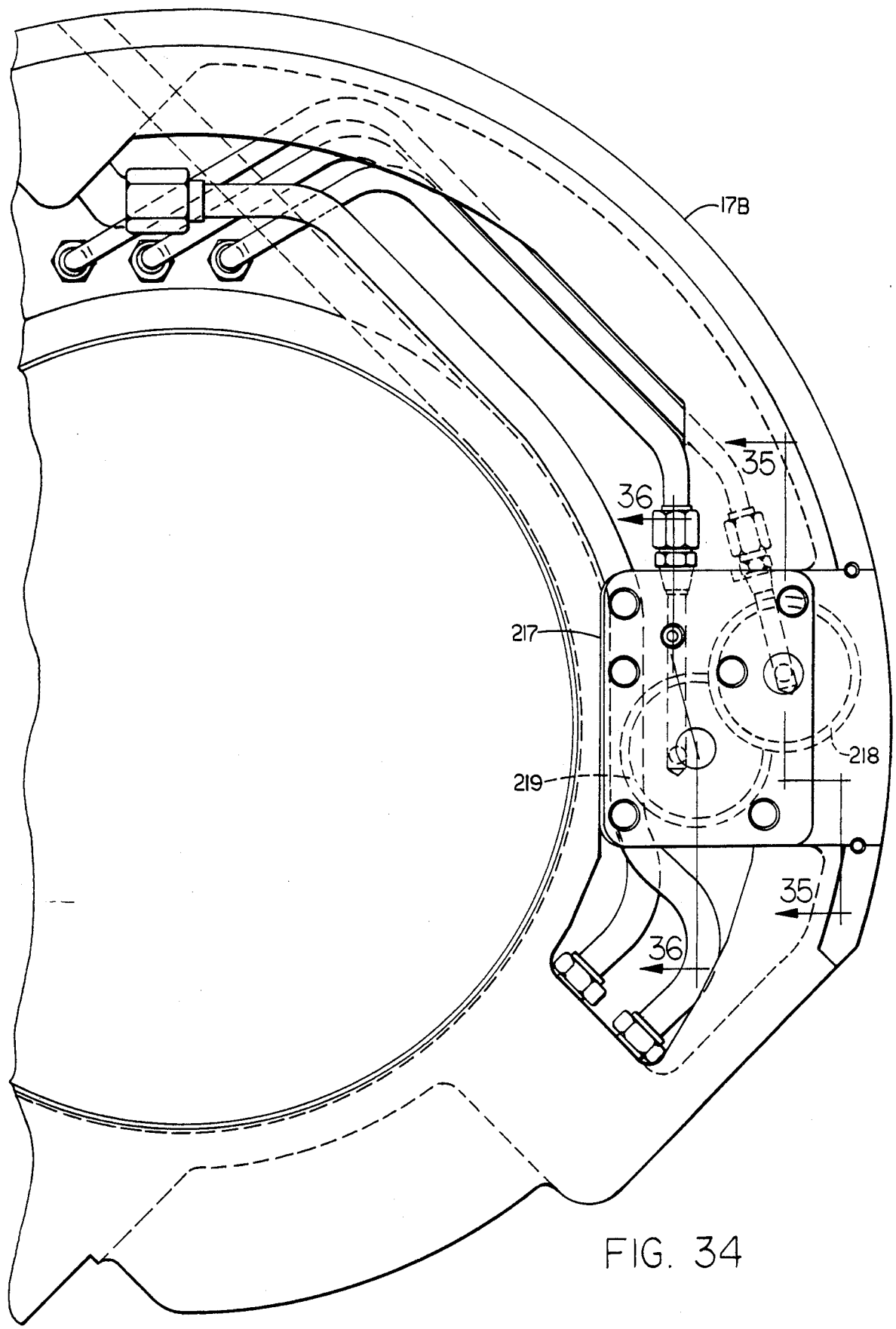
FIG. 34 is an end view of the actuator block of the turret housing.
Figure 35:
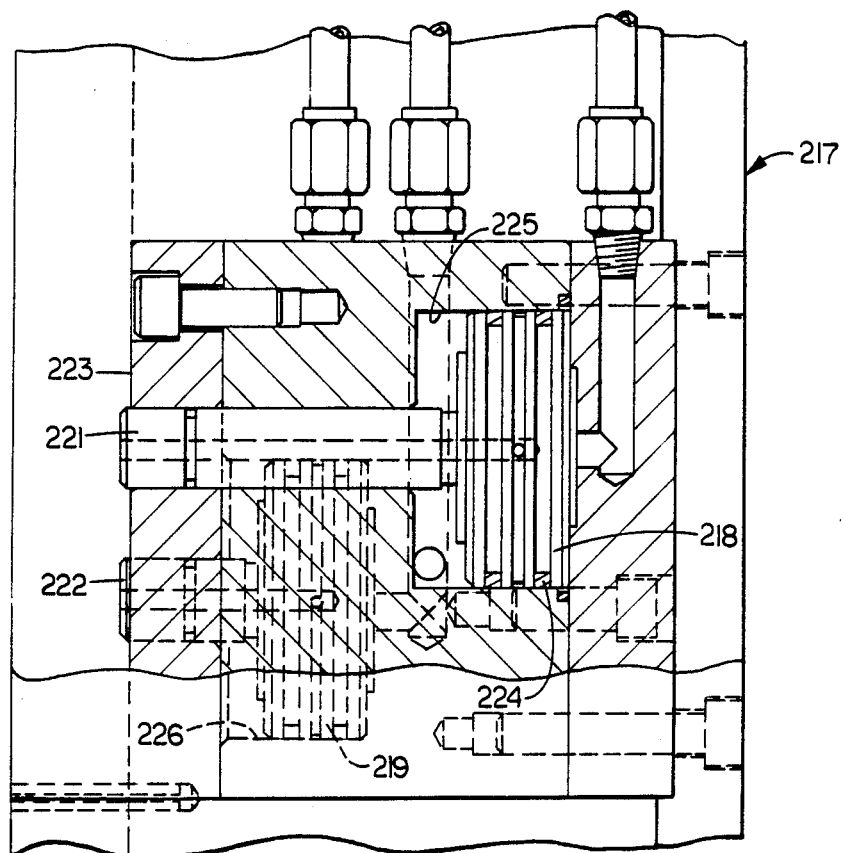
FIG. 35 is a side elevational section taken along the line 35—35 of FIG. 34.
Figure 36:
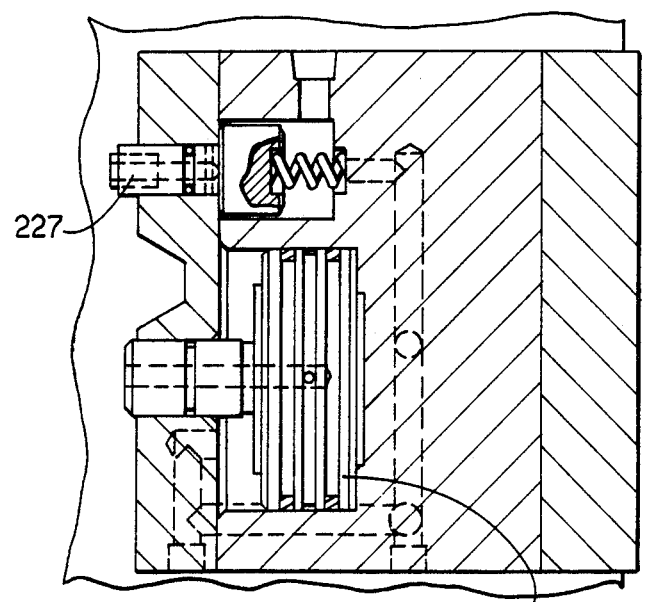
FIG. 36 is a side elevational section taken along the line 36—36 of FIG. 34.

FIG. 34 illustrates the single actuating block 217 which is carried in the tool turret housing 17(b), and the block 217 serves to actuate the individual tool holder blocks 79 as they are presented to the tool interchange position shown. The actuating block 217 carries a plurality of pistons 218,219 (FIGS. 35 and 36), for firing the release pins 213,214 in the respective tool holder blocks 79. The actuator block 217 is secured to the turret housing 17(b) by a plurality of screws 220, and is supplied with fluid pressure from a power source through suitable tubing and fittings. The actuating pistons 218,219 are carried in the tool actuating block 217, having their piston rods 221,222 extending slightly beyond the front face of the end cap 223. The pistons 218,219 have respective piston rings 224 which seal the piston in suitable cylinders 225,226 machined in the actuator block 217. Under suitable fluid pressure, the piston rod will be forced forward, thus striking a respective release pin to overcome the locking hold on the tool. The actuator block 217 also carries a actuating pin 227, which serves to trigger an air switch, to signify the presence of a tool holder block 76.

Magazine Pallet

Figure 37:
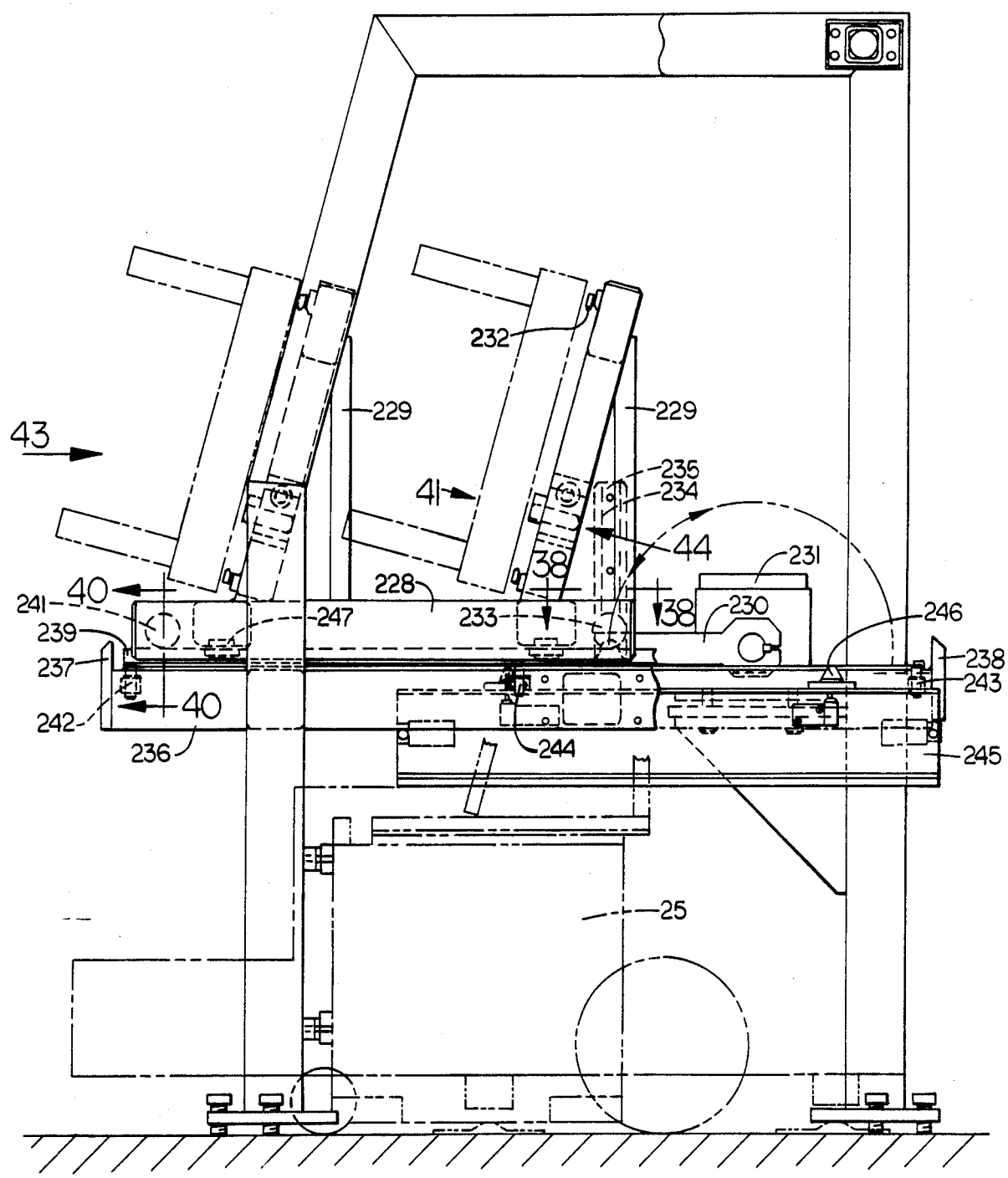
FIG. 37 is a side elevational view of the pallet system.

FIG. 37 depicts an end or side view of the frame work surrounding the cart 25, at the interchange end of the assembly. A pallet 228 carries a pair of slanted support brackets 229, which are each fitted with V-ways 232 to receive a tool storage magazine 14. The pallet 228 is shiftable between two positions, by a crank 230 powered by a rotary actuator 231 through 180 degrees. The crank 230 has a roller 233 at its outboard end, which is received in a vertical guide slot 234 on a guide block 235 secured to the pallet 228. When rotated through 180 degrees clockwise, the pallet 228 undergoes harmonic movement from a front position shown in solid, to a rear position (not shown) to cause the respective angle support brackets 229 to alternately line up with the tool changer base 12. The pallet 229 is brought into position by the motorized cart 25, and is elevated into position over the top of the pallet support plate 236. The pallet support plate 236 has end stops 237,238 at its front and rear ends, and guide ways 239,240 are provided on the pallet support plate. A plurality of vertical and horizontal rollers 241 are provided on the pallet 228 to guide against the guide ways 239,240. Front, rear, and center proximity switches 242,243,244 are carried on the pallet guide plate 236, to sense positions of thepallet 228. The motorized cart 25 has a pair of central I-beam supports 245, which have conical locating devices 246, which are received in conical seats 247 in the bottom of the pallet 228, as the I-beam supports 245 are moved vertically to engage the pallet 228. Once the pallet 228 is lifted from the assembly by the I-beam support 245, the cart 25 may be rolled out from under the pallet support plate 236. The sectional view of FIG. 38 depicts the crank arm 230 having its roller 233 inserted in the vertical guide slot 234 of the vertical guide block 235 on the angle support 229 of the pallet 228. FIG. 39 shows the roller 233 secured in the crank arm 230, by a nut 248 threadably received on the roller shaft, and a pair of stop blocks 249 are secured to the sides of the crank arm 230 by countersunk screws 250. The stop blocks 249 contact the stop screw 251 in the pallet support plate 236. One side of the pallet 228 is fitted with a V-shaped guide way 239, and a V-shaped roller 252 is secured to the pallet.

FIG. 40 illustrates the support rollers on the pallet 228, wherein one side of the pallet 228 is fitted with straight rollers 253 riding on a flat guide way 240 on the pallet support plate 236.

Figure 43:
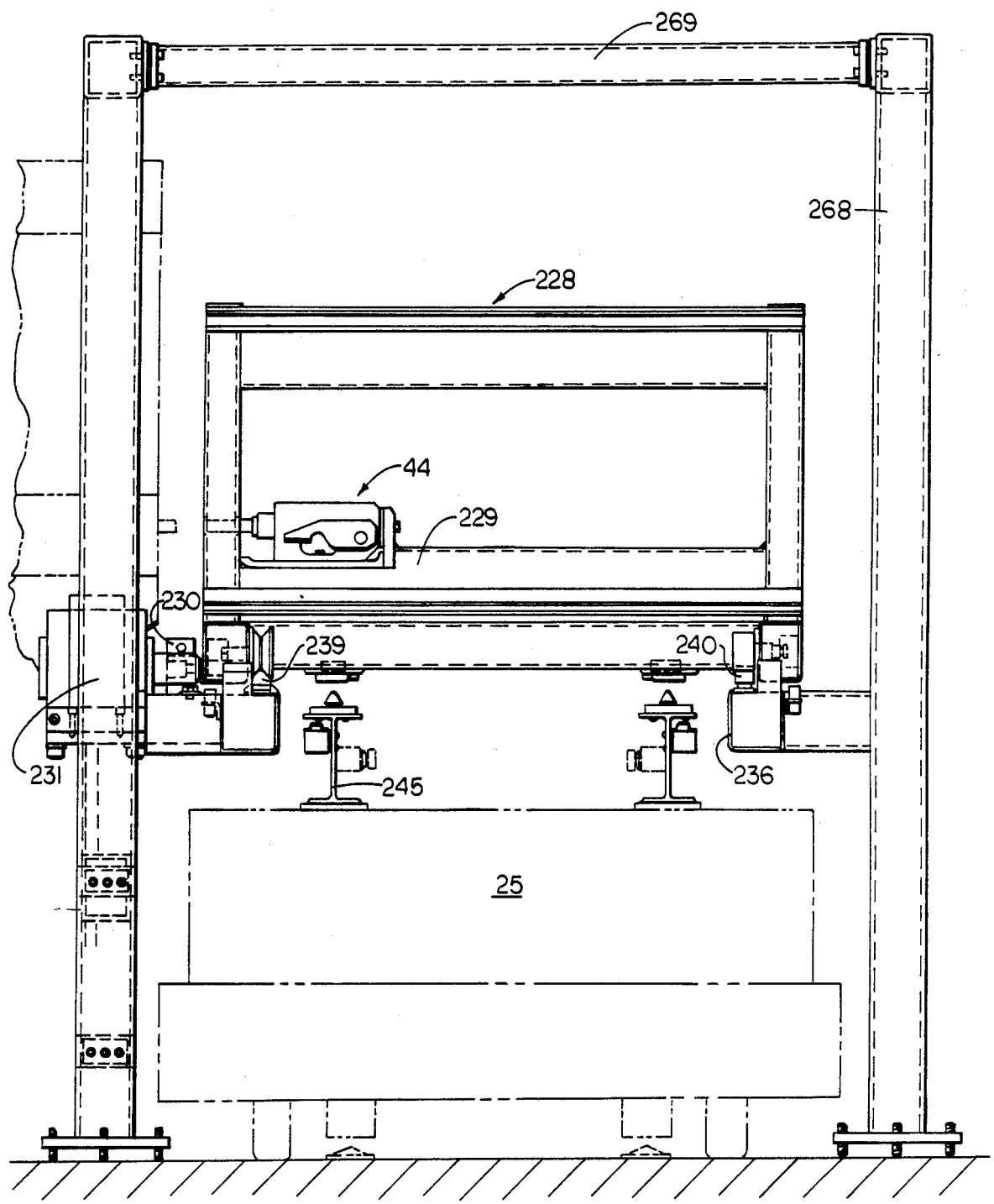
FIG. 43 is a front elevational view of the pallet system taken in the direction of arrow 43 of FIG. 37.

FIG. 41 is a front view of the latching mechanism 44 which secures the tool support magazine 14 in position with the respective angle bracket 229 on the pallet 228. The latching mechanism 44 is comprised of a housing 254, having a pivotable latch lever 255 with a notch 256 machined therein for retaining the roller 161 (see FIG. 25) of a tool storage magazine 14. The outboard end of the lever 255 is pointed, so that the lever 255 can be cammed up by an entering roller 161. The pivot pin 247 is keyed to the lever 255, and keyed to a secondary lever 258, which is linked to a slidable actuating rod 259 carried in the housing 254. The secondary lever 258 is pinned to the actuating rod 259 so that as the rod 259 is moved inward, the latching lever 255 will be pivoted upward, and the reverse. The actuating rod 259 has a guide bushing 260 threadably received thereon, and the bushing 260 is slidable in a bore 261 in the housing 254. A biasing spring 262 is compressed in the housing bore 261, serving to bias the latching lever 255 to a locked, down position. The outer end of the actuating rod is fitted with a hardened button 263, having a stem portion 264 threadably received in the end of the actuating rod 259. The button 263 is adjustable, and locked in position by a lock nut 265. The plan view of FIG. 42 shows that the bushing 260 has a guide pin 266 extending through the side wall of the housing 254, in a slot 267, to keep the bushing 260 from rotating. Referring to FIG. 43, the pallet 228 is shown in position on its support ways 239,240 on the pallet support plate 236. The I-beam supports 245 of the cart 25 are shown in a retracted position, below the pallet 228. At a desired time, the I-beam supports 245 are vertically moved to lift the pallet 228 from the pallet support 236. The pallet support plate 245 is shown with the crank arm 230 and actuator 231 secured together. The main frame 268 of the pallet support is rectangular tubing, tied together by horizontal overhead flanged support tubes 269. A typical latching mechanism 44 is shown on the angular support 229 of the pallet 228. There are a pair of the latching mechanisms 44 employed, one on each angular support 229.

FIG. 44 is a rear view of the latching mechanism 44 shown in FIG. 43, wherein the tool changer base 12 has a plate 269 secured to its back face by screws 270, and the plate 269 carries a fluid-operated cylinder 271 whose actuating piston rod 272 is aligned with the actuating rod 259 of the latching mechanism 44. Once the pallet 228 is in position on the pallet support plate 236 (at one of the two interchange positions), the actuating piston rod 272 is moved over to the left, engaging the button 263 of the actuating rod 259, and lifting the latching lever 255 to the unlock position. The movement of this stroke is that of switch dog 273 carried on the opposite end of the piston rod 272, which is sensed by a pair of proximity limit switches 274,275 carried on an angle bracket 276 secured to the plate 269. The actuating piston rod 272 is withdrawn when it is desired to move the pallet 228 to an alternate position on the pallet support plate 229, or when it is desired to remove the pallet 228 from the pallet support plate 229.

Fluid Circuits

Figure 46A:
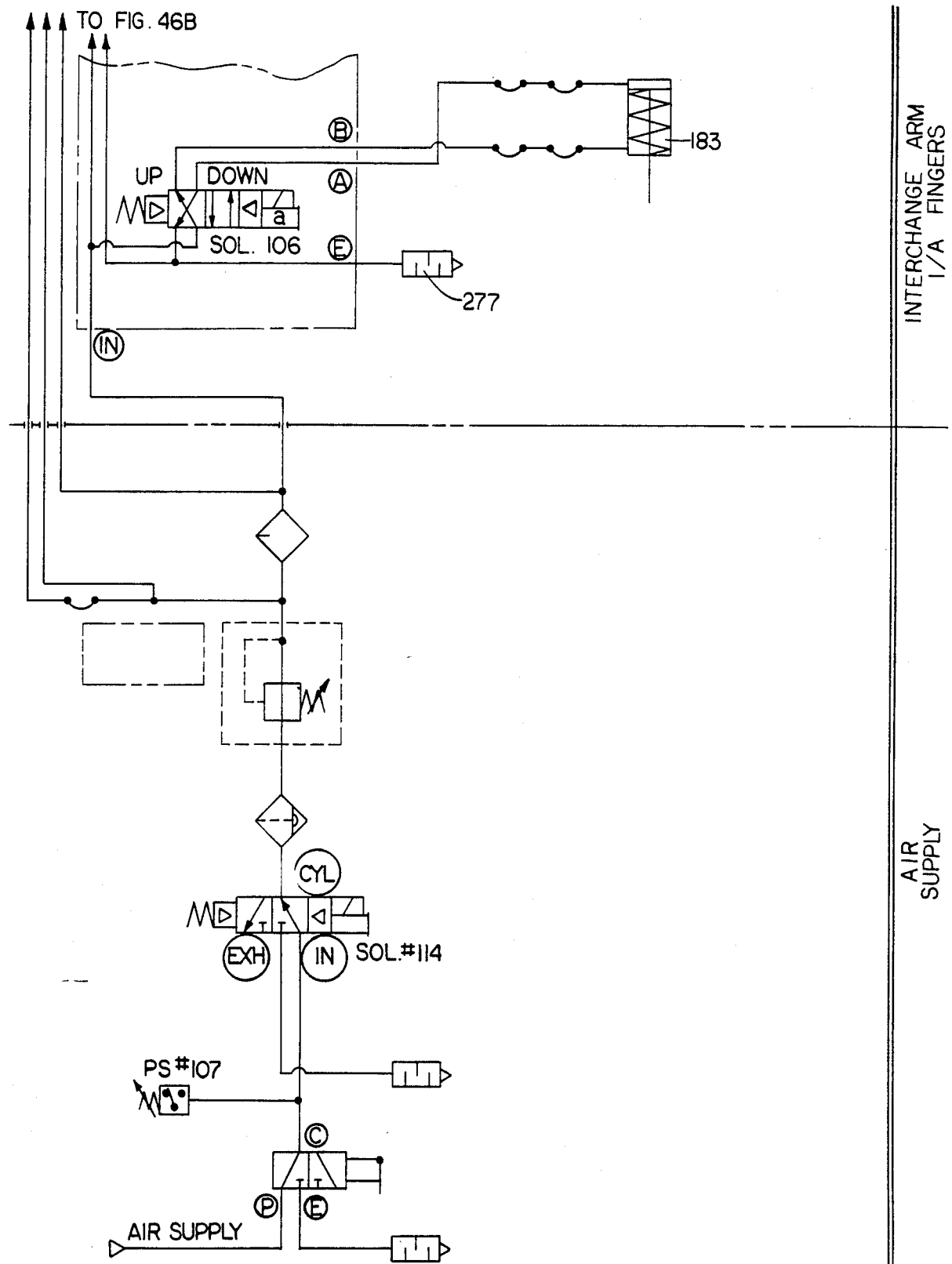
FIGS. 46a and 46b constitute a pneumatic circuit diagram.
Figure 46B:
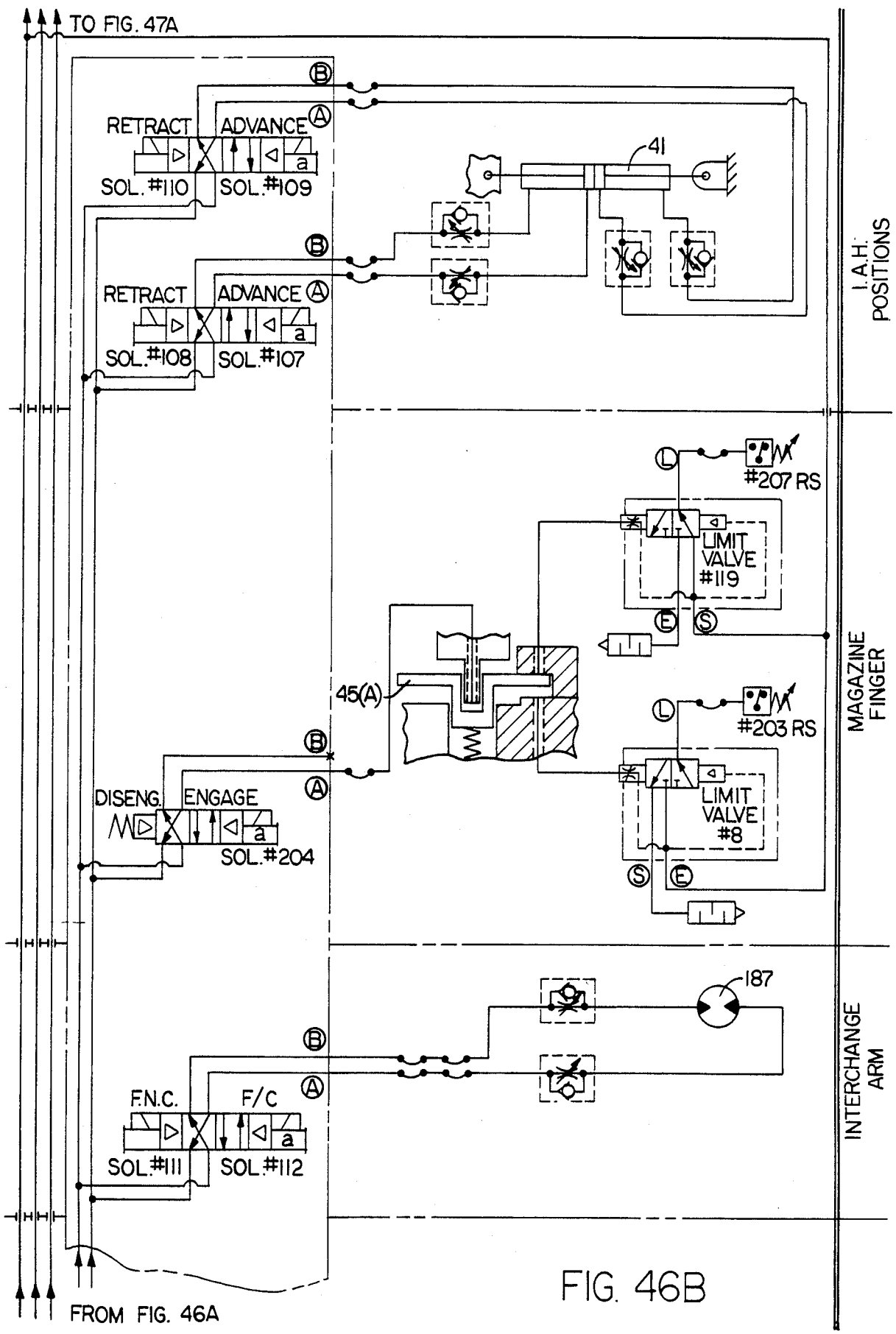

FIG. 46 is a penumatic diagram, wherein an air supply of regulated lubricated air is brough to the circuit, and to a series of solenoid operated air valves, which are not shown on the mechanical drawings, but rather are located together on a manifold (not shown) but whose design is well within the scope of a machine designer. The first solenoid valve 106 is a four-way valve for actuating the piston 183 of the interchange arm housing 23, to up and down positions. The piston 183 is spring biased to the up position, as well. The second section of the diagram depicts solenoid valves 111 and 112, for powering the rotary actuator 187 of the interchange arm housing 23, thus rotating the gripper assembly 185. The third section of the diagram depicts solenoid valve 204, which is used for powering the magazine finger 45(a) to a down position, engaging the tool storage magazine 14, when the magazine 14 is to be moved to or from the pallet 228. Air limit valves and switches are provided to insure that the magazine finger 45(a) is in the up or down positions, before subsequent movement of the magazine 14 can take place. The final section of the diagram depicts solenoids 107, 108, 109, and 110, which are used to power the tandem turn around cylinder unit 41, for rotating the interchange arm housing 23. All exhaust air is directed through air mufflers 277 and to the atmosphere.

Figure 47A:
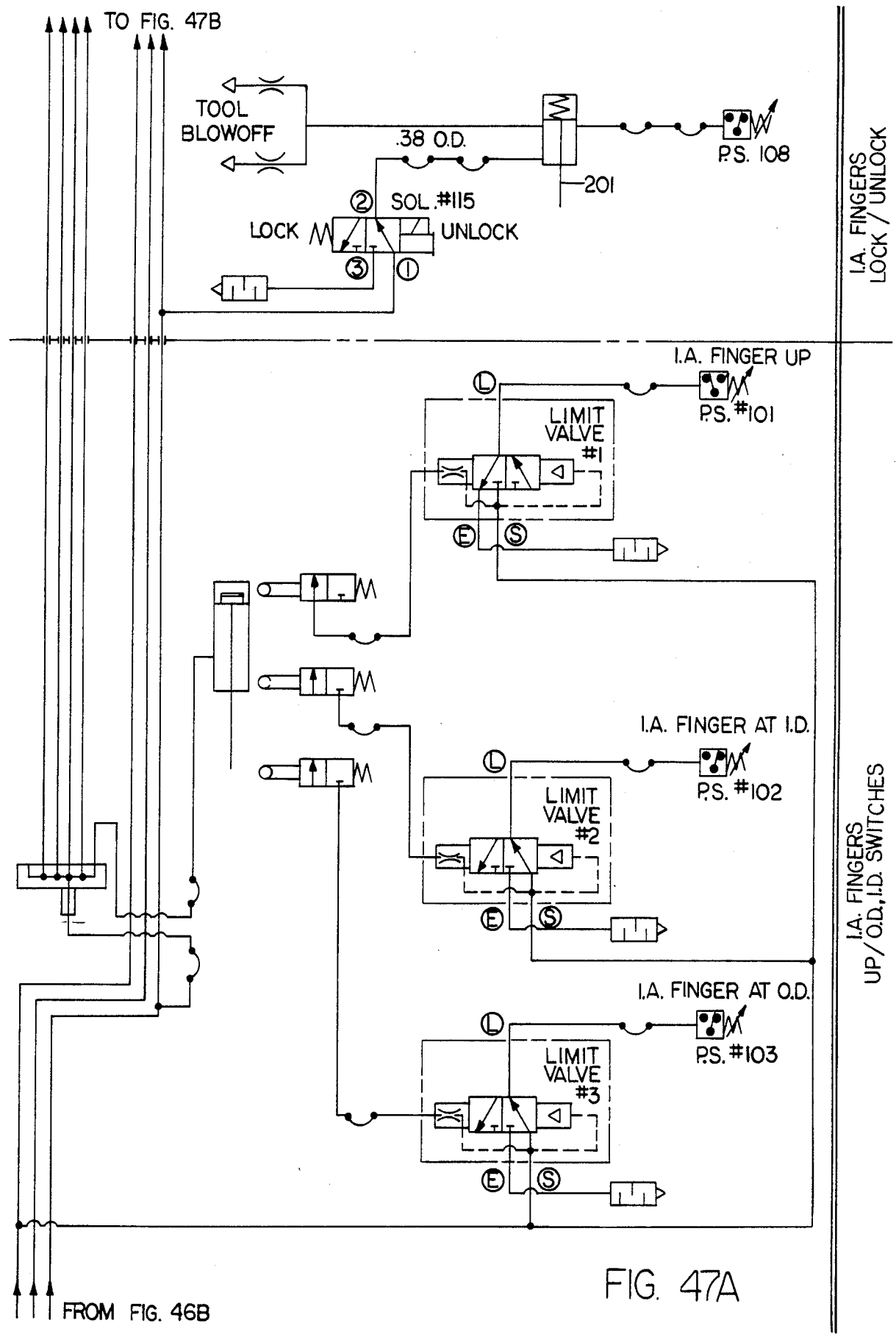
FIGS. 47a and 47b constitute a pneumatic circuit diagram.
Figure 47B:
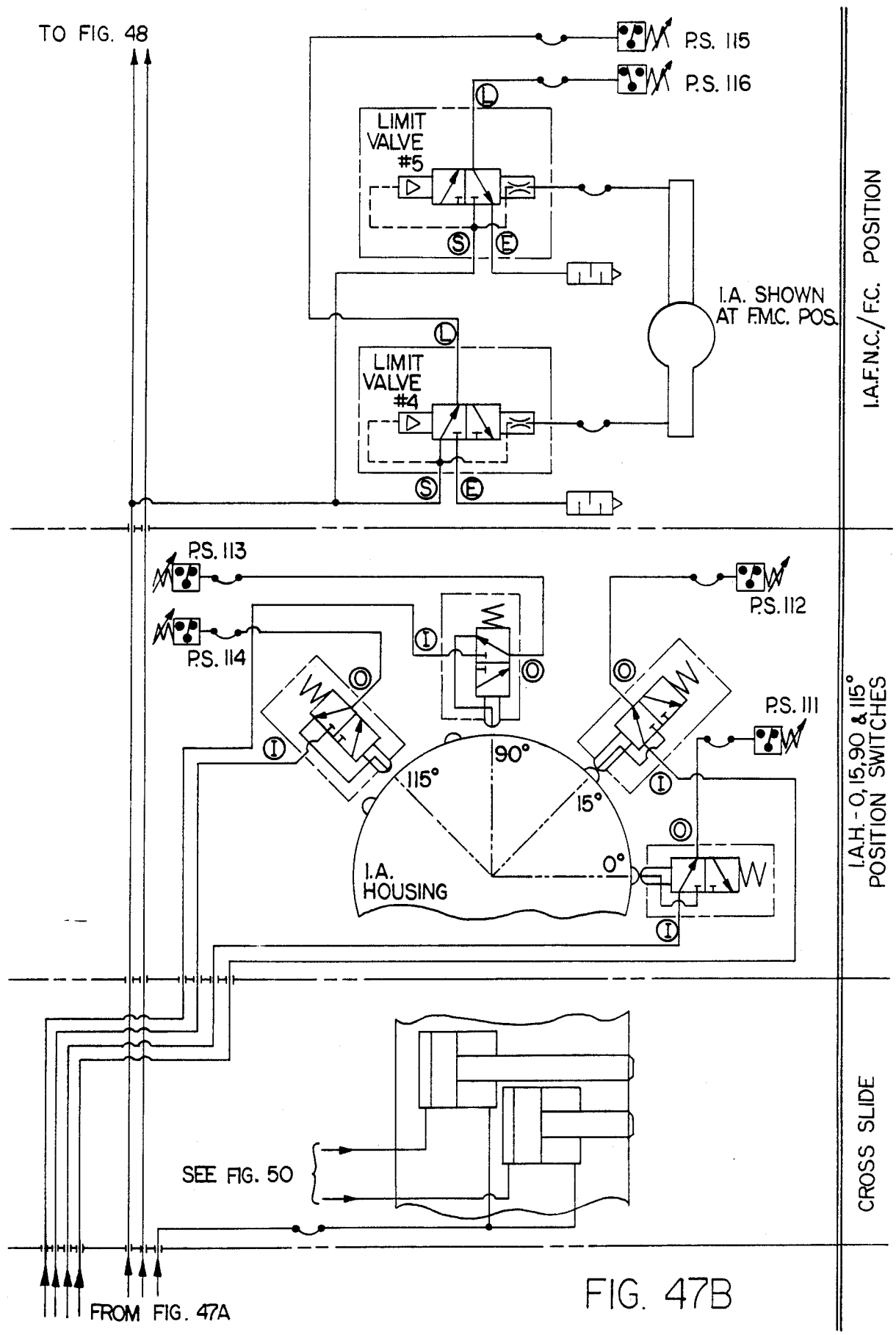

FIG. 47 is a continuation of the pneumatic diagram begun in FIG. 46, wherein the first section depicts air limit valves 1, 2, and 3, and pressure switches 101, 102, 103, which are actuated by the position valve shown, to detect the vertical positions of the interchange arm gripper fingers 22. The second section of the diagram depicts solenoid valve 113, which is used to power the ball detent rod 201 of the interchange arm fingers 22 to an unlocked position; thereafter the rod 201 is spring-biased into a locking mode. The third section of the diagram illustrates air supplies to the actuator block 217, which retracts the actuating pistons 218,219. (The pistons are powered to the forward, or unlock, position by hydraulic pressure on the piston face). The fourth section of the diagram illustrates certain position switches 76 for detecting the rotary positions of the interchange arm housing 23. The trip cams 74 are shown on the cam block 75 for contacting the plungers of the respective position switches 76. Pressure switches are used in combination with the position switches. The final section of the diagram illustrates air limit valves 4 and 5, which sense the rotary position of the interchange arm housing 23.

Figure 48:
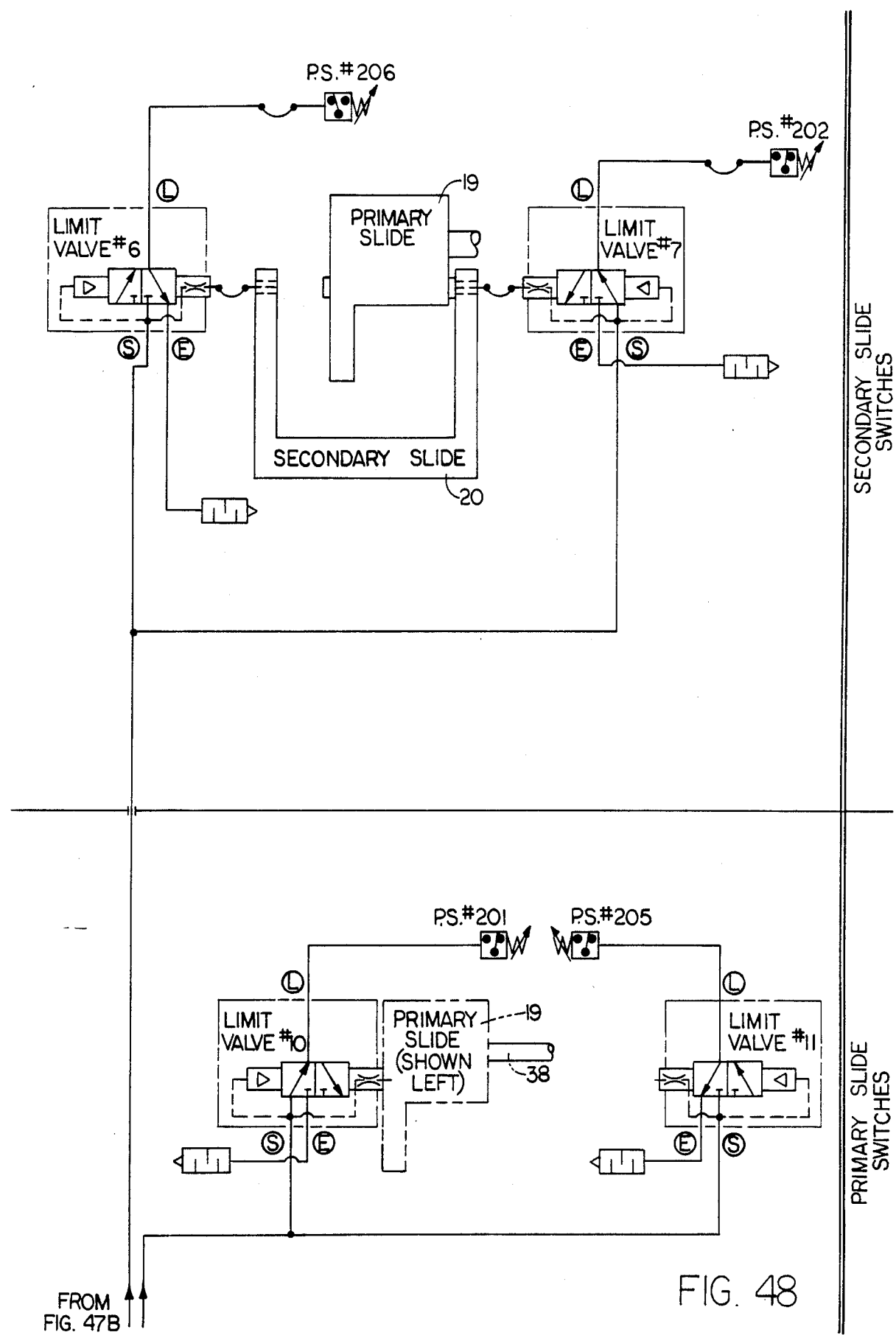
FIG. 48 is a pneumatic circuit diagram.

FIG. 48 is a continuation of the pneumatic diagram, wherein the first section illustrates the primary slide switches, for signalling the endmost positions of the primary slide 19 on the drive screw 38. The second section of the diagram illustrates the secondary slide 20 switches, wherein the secondary slide 20 is moved relative to the primary slide 19, and air pressure ports are closed off by the primary slide 19 at the right and left positions.

Figure 49A:
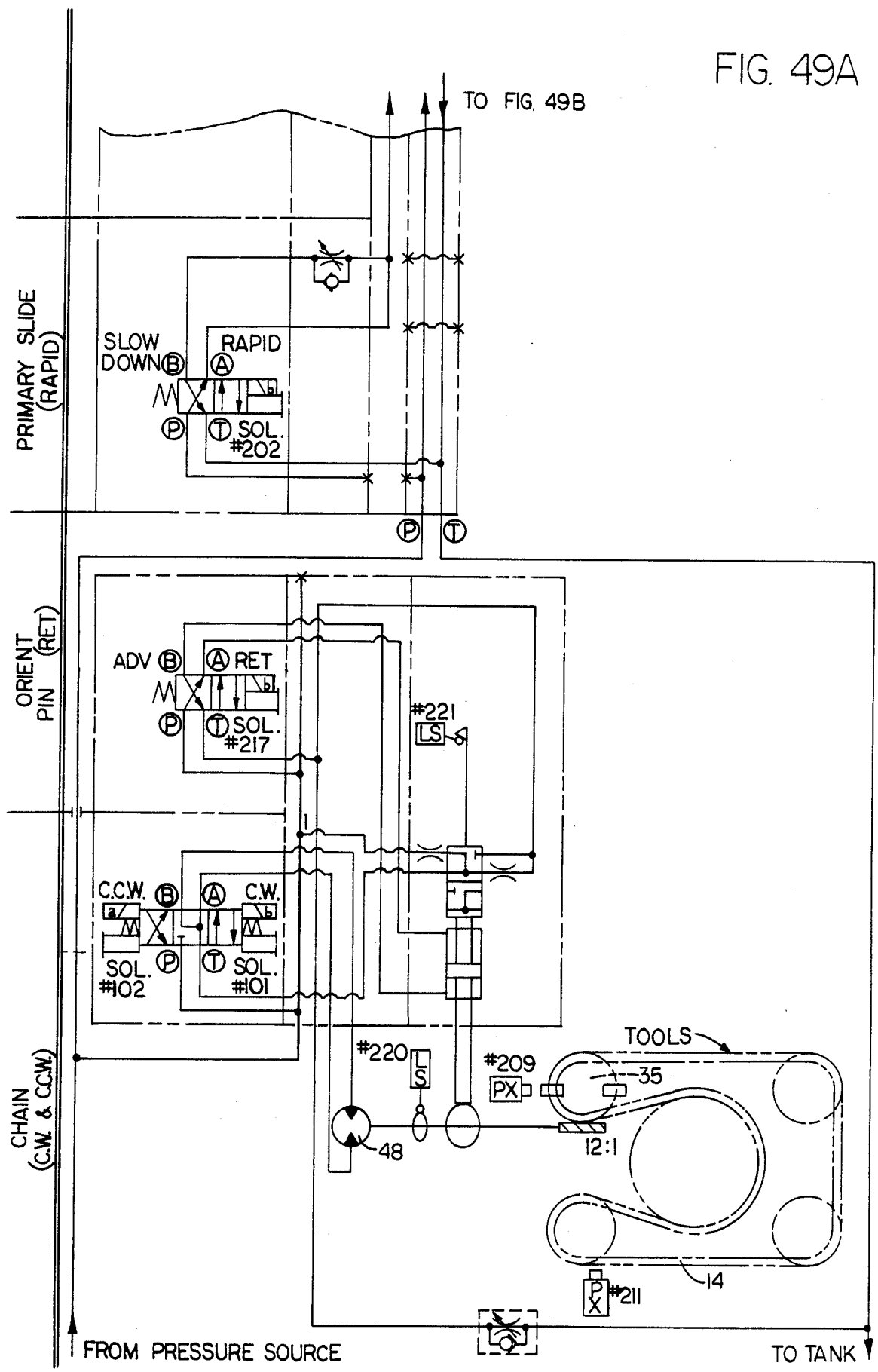
FIGS. 49a and 49b constitute a hydraulic circuit diagram.
Figure 49B:
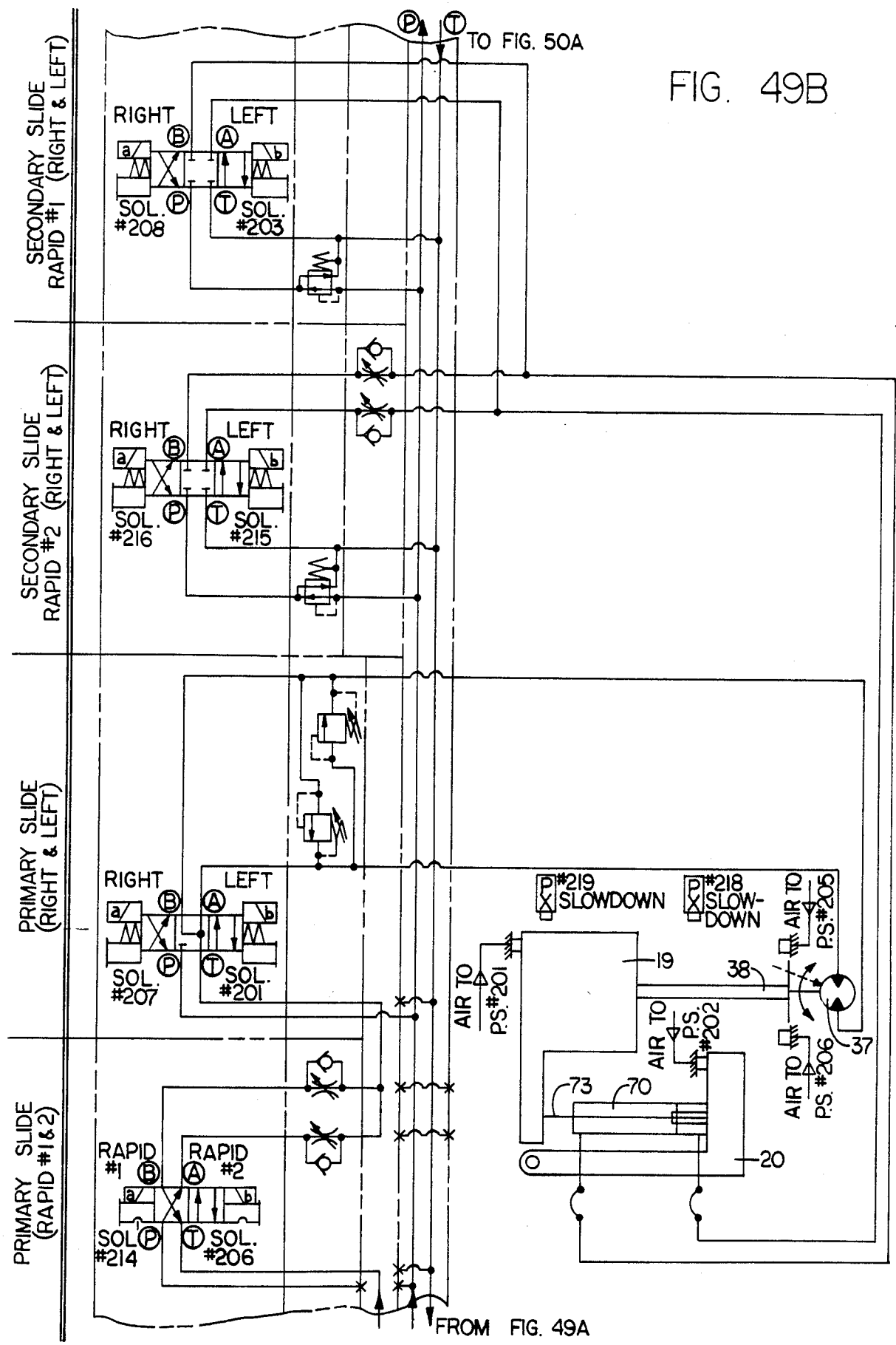

FIG. 49 is a hydraulic diagram, wherein pressure is received from a suitable pressure source (not shown) and return lines from the circuit are extended back to a hydraulic tank (not shown). The first section of the diagram illustrates a solenoid operated valve for controlling the hydraulic index motor 48 which drives the worm 53 and worm wheel 55 of the index mechanism 32. Appropriate limit switches and proximity switches PX209 and 211 are shown for sensing positions of the tool magazine 14. The second section of the diagram depicts a solenoid operated valve for actuating an index spindle orient device, wherein a cylinder is powered against a cam, at appropriate times, to orient the angular position of the index keys 35 to the horizontal position. The remaining sections of the diagram depict solenoid operated valves for providing rapid and slowdown rates to the primary and secondary slides 19.20. The primary slide 19 is driven by the hydraulic feed motor 37 through the feed screw 38, and the secondary slide 20 is powered relative to the primary slide by the hydraulic cylinder 70 secured to the secondary slide 20, and having its piston rod 73 secured to the primary slide 19. Suitable proximity switches 218 and 219 are utilized to initiate slowdown feed rates, and the end positions of the primary slide 19 are sensed by air pressure switches 201, 205, and 206. The extreme left position of the secondary slide 20 is sensed by an air pressure switch 202.

Figure 50A:
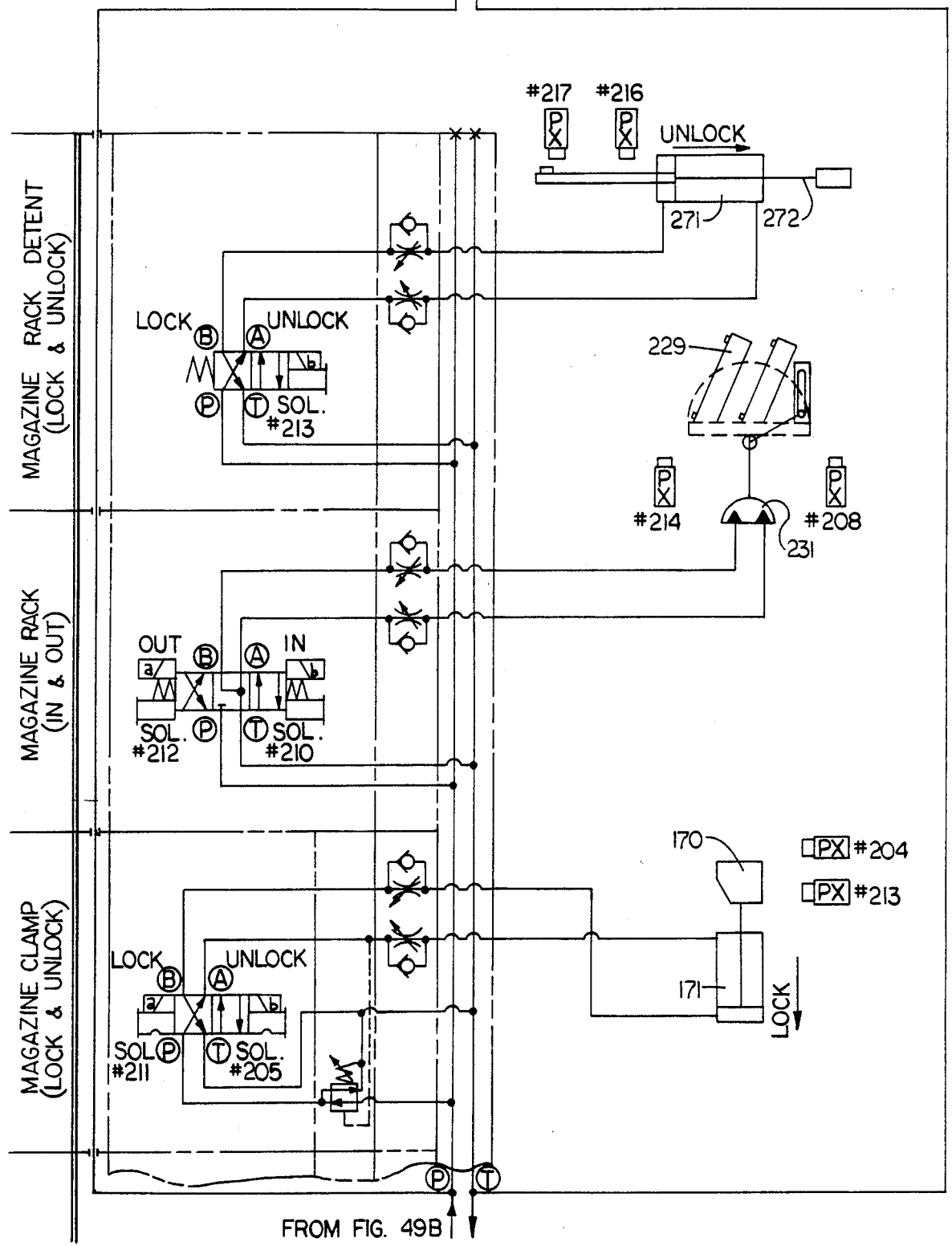
FIGS. 50a and 50b constitute a hydraulic circuit diagram.
Figure 50B:
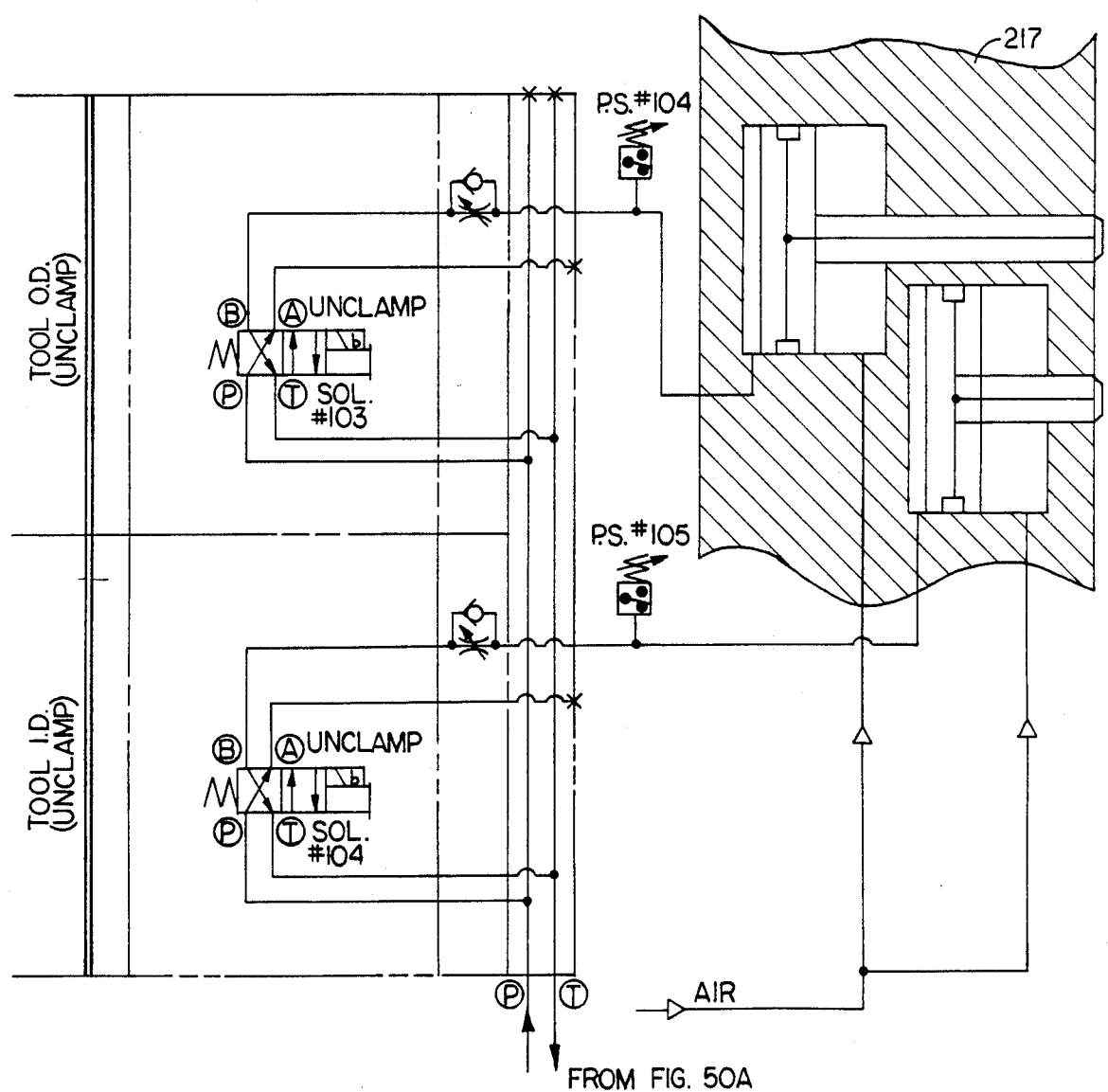

FIG. 50 is a continuation of the hydraulic diagram of FIG. 49, wherein the first section of the diagram illustrates a solenoid operated valve for porting fluid pressure, to lock and unlock the magazine in position. The down and up, or lock and unlocked, of the magazine clamp locking slide 170 positions are sensed by proximity switches PX204 and 213. The second section of the diagram illustrates a solenoid operated control valve for powering the rotary actuator 231 of the magazine pallet support 228, wherein the actuator 231 moves the angular supports 229 of the pallet to alternate positions through rotation of the crank. End positions of the pallet are sensed by proximity switches PX208 and 214. The third section of the diagram illustrates a solenoid operated valve for powered the actuator piston rod 272 of the cylinder 271 for unlocking the latching assembly 44 of the pallet, to release the magazine for transport into the tool changer base 12. The fourth and fifth sections of the diagram depict solenoid valves for porting hydraulic pressure to the turret housing actuator block 217 for unclamping the respective ID and OD tools.

While the invention has been shown in connection with the preferred embodiment depicted herein, it is not intended that the invention be limited to this specific embodiment, but rather the inventions extends to all such designs and modifications as come within the scope of the appended claims.

What is claimed is:

1. A tool changer system for turning machines utilizing turning tools carried in discrete tool holders supported in a tool turret, comprising:
   (a) a tool changer base;
   (b) a tool storage magazine received on said base and releasably secured thereto;
   (c) a slideway secured to said base;
   (d) a primary slide moveable on said slideway in reverse directions;
   (e) a secondary slide carried by said primary slide, and moveable relative thereto in said reverse directions;
   (f) an interchange arm, rotatably mounted to said secondary slide, and rotatable with respect thereto about an arm axis transverse to said slide directions;
   (g) a gripper finger assembly, rotatably mounted to said interchange arm assembly about a gripper axis, and axially moveable with respect to said interchange arm housing along said gripper axis;
   (h) means for gripping a tool located in said tool storage magazine;
   (i) means for gripping a tool located in said tool holder on said machine turret.

2. In a turning machine having a rotatable headstock spindle, a tool turret supporting turning tools and movable relative to said spindle, and a tool storage mechansim, an improved dualslide toolchange arm for interchanging tools between said turret and said tool storage mechanism, the improvement comprising:
   (a) a generally horizontal slideway fastened to a machine base;
   (b) a first slide movable on said slideway parallel to the rotary axis of said spindle;
   (c) means for moving said first slide on said slideway;
   (d) a second slide carried by said first slide and movable with respect thereto parallel to the rotary axis of said spindle;

(e) means for moving said second slide on said first slide;
(f) an interchange arm assembly pivotally carried by said second slide on a pivot axis normal to first and second slide movements;
(g) means for pivoting said arm assembly on said second slide;
(h) a gripper assembly, including a dual set of gripper fingers, and rotatable with respect to said housing;
(i) means for rotating said gripper assembly about a gripper axis parallel to said pivot axis; and
(j) means for moving said gripper assembly along said gripper axis.

* * * * *